United States Patent
Fortin et al.

(10) Patent No.: US 9,037,322 B2
(45) Date of Patent: May 19, 2015

(54) STEERING SYSTEM AND METHOD FOR TRAIN VEHICLE

(71) Applicant: Prairie Machine & Parts Mfg. (1978) Ltd., Saskatoon (CA)

(72) Inventors: Adam Fortin, Saskatoon (CA); Ashley Debnam, Brisbane (AU); Sterling Parson, Saskatoon (CA)

(73) Assignee: Prairie Machine & Parts Mfg. (1978) Ltd., Saskatoon (CA)

( * ) Notice: Subject to any disclaimer, the term of this patent is extended or adjusted under 35 U.S.C. 154(b) by 70 days.

(21) Appl. No.: 13/750,152

(22) Filed: Jan. 25, 2013

(65) Prior Publication Data

US 2013/0190987 A1   Jul. 25, 2013

Related U.S. Application Data

(60) Provisional application No. 61/590,370, filed on Jan. 25, 2012, provisional application No. 61/668,072, filed on Jul. 5, 2012.

(51) Int. Cl.

| G05D 1/00 | (2006.01) |
|---|---|
| G05D 3/00 | (2006.01) |
| G06F 7/00 | (2006.01) |
| G06F 17/00 | (2006.01) |
| B62D 5/04 | (2006.01) |

(Continued)

(52) U.S. Cl.
CPC .............. B62D 5/0457 (2013.01); B62D 13/00 (2013.01); B62D 12/00 (2013.01); B62D 13/04 (2013.01)

(58) Field of Classification Search
USPC .......................................................... 701/41
See application file for complete search history.

(56) References Cited

U.S. PATENT DOCUMENTS 5,244,226 A * 9/1993 Bergh ........................... 280/442
5,329,451 A    7/1994 Notsu
(Continued)

FOREIGN PATENT DOCUMENTS

GB    2398047 A    8/2004
JP    09-328078 A    12/1997

OTHER PUBLICATIONS

Kar-Tech, Length & Angle Sensor Data Sheet, as retrieved from www.kar-tech.com/lengthangle.html on or before Dec. 12, 2011.
(Continued)

*Primary Examiner* — Bhavesh V Amin
(74) *Attorney, Agent, or Firm* — Gifford, Krass, Sprinkle, Anderson & Citkowski, P.C.

(57) ABSTRACT

A steering system, method, and computer-readable medium for controlling a steerable, self-propelled vehicle for travelling in an end-to-end series of steerable, self-propelled vehicles, the vehicle including a plurality of individually controllable propelling devices connected at a generally vertical pivot to an axle of the vehicle. The steering system includes: an angle sensor for detecting an inter-vehicle angular position between two of the vehicles and providing a corresponding signal indicative thereof; a distance sensor for detecting an inter-vehicle distance between two of the vehicles and providing a corresponding signal indicative thereof; and a controller system. The controller system is configured to: receive the signals from the angle sensor and the distance sensor, control a speed of each propelling device based on the inter-vehicle distance, and control an angle of each propelling device based on the inter-vehicle angular position.

21 Claims, 23 Drawing Sheets

(51) Int. Cl.
  *B62D 13/00* (2006.01)
  *B62D 12/00* (2006.01)
  *B62D 13/04* (2006.01)

(56) References Cited

U.S. PATENT DOCUMENTS

| | | | | |
|---|---|---|---|---|
| 5,366,059 | A | * | 11/1994 | Demong ........................ 198/303 |
| 5,579,228 | A | * | 11/1996 | Kimbrough et al. ............ 701/41 |
| 6,571,178 | B1 | * | 5/2003 | Koch et al. ...................... 702/33 |
| 7,076,346 | B2 | | 7/2006 | Sturges et al. |
| 7,949,447 | B2 | * | 5/2011 | DeMong et al. ................. 701/41 |
| 2001/0054524 | A1 | | 12/2001 | Masters et al. |

OTHER PUBLICATIONS

Iqbal; "Self-Organizing Wireless Sensor Networks for Inter-Vehicle Communication"; School of Information Science, Computer and Electrical Engineering; Halmstad University; Mar. 2006.

Written Opinion of the International Searching Authority—Application No. PCT/CA2013/050050.

International Search Report and Written Opinion of the International Searching Authority—Application No. PCT/CA2013/050049.

* cited by examiner

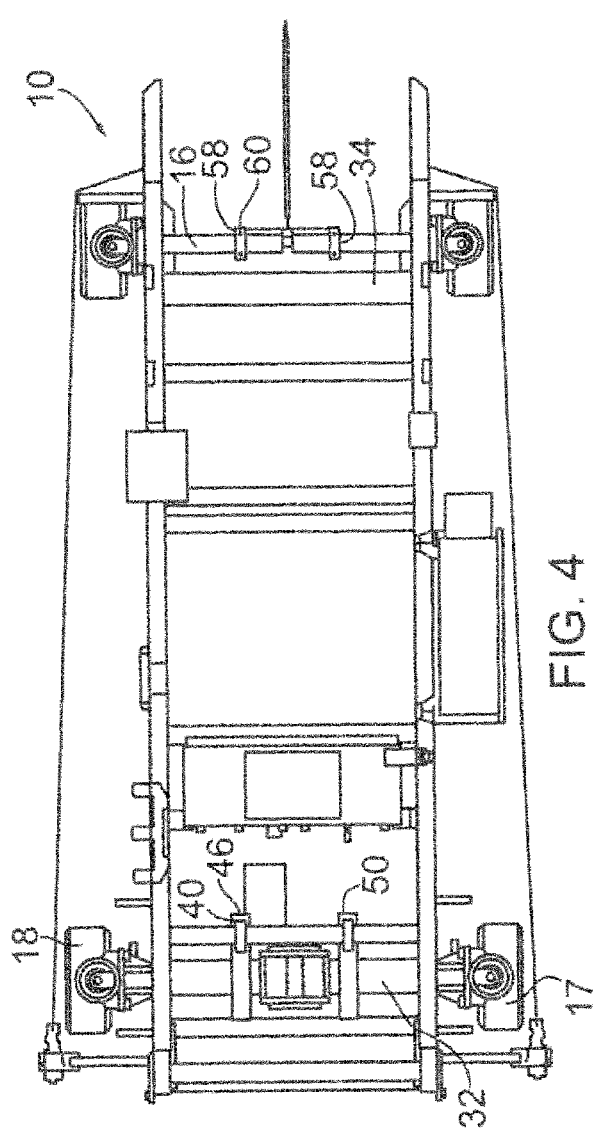
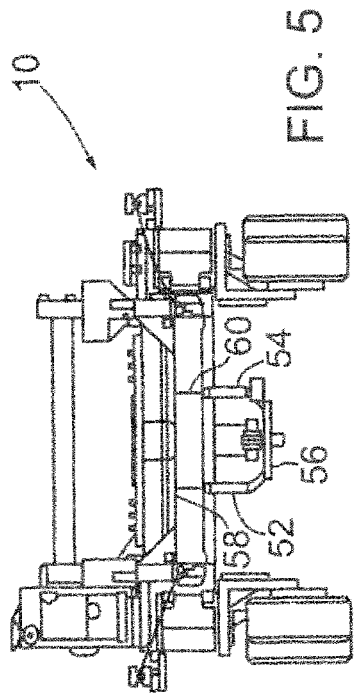

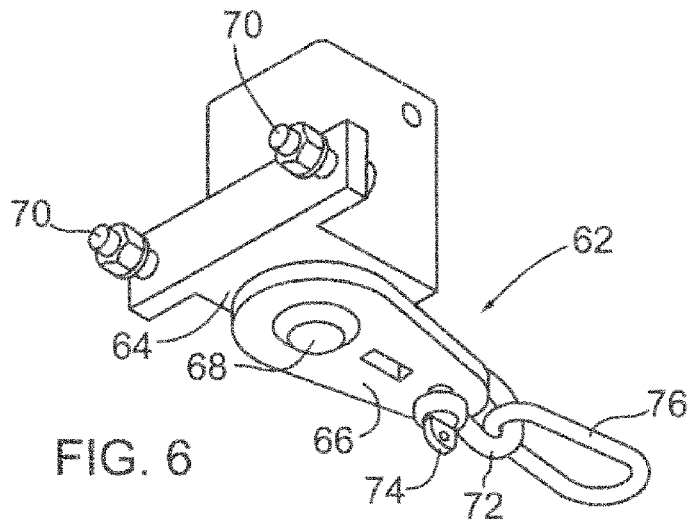
FIG. 6
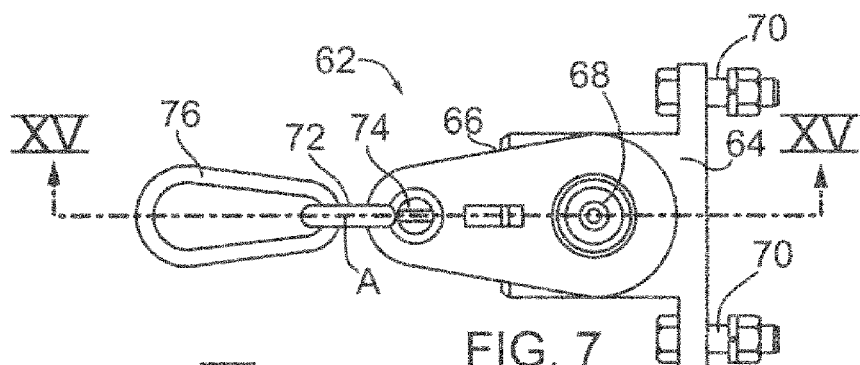
FIG. 7
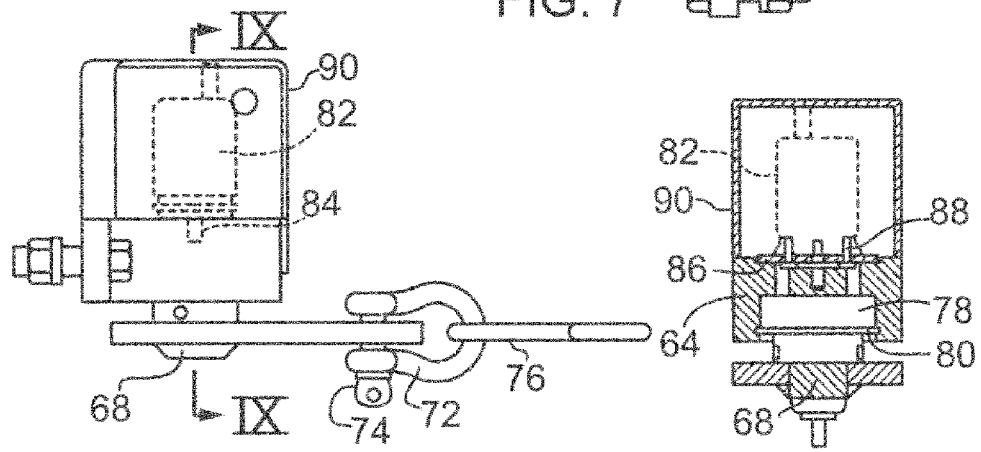
FIG. 8
FIG. 9

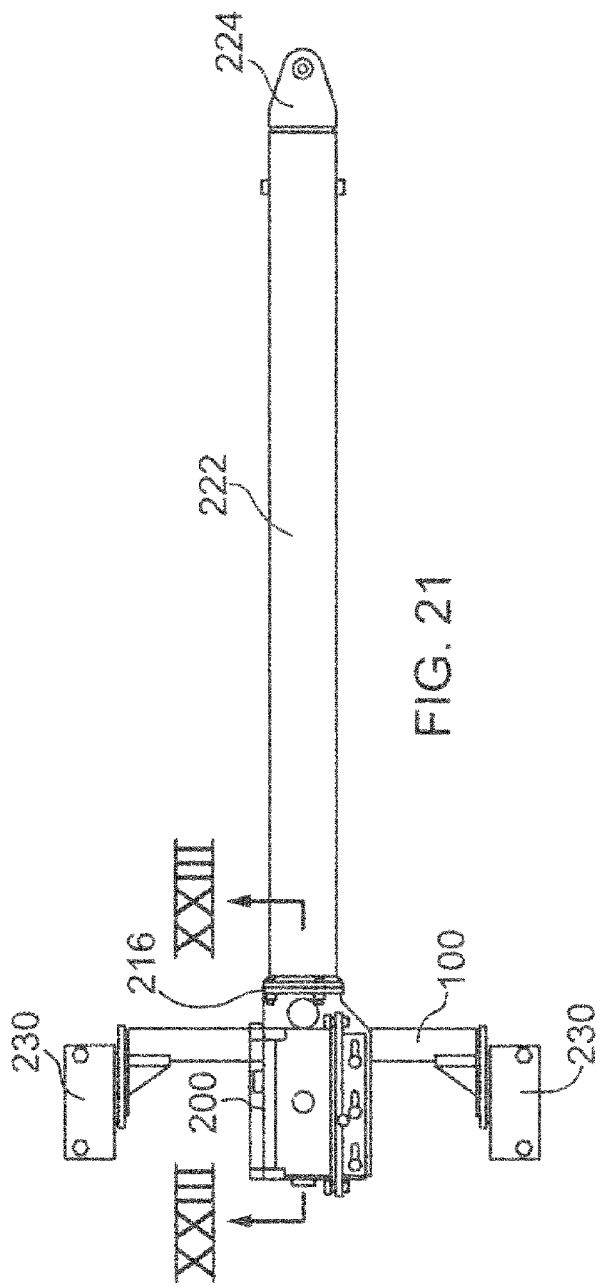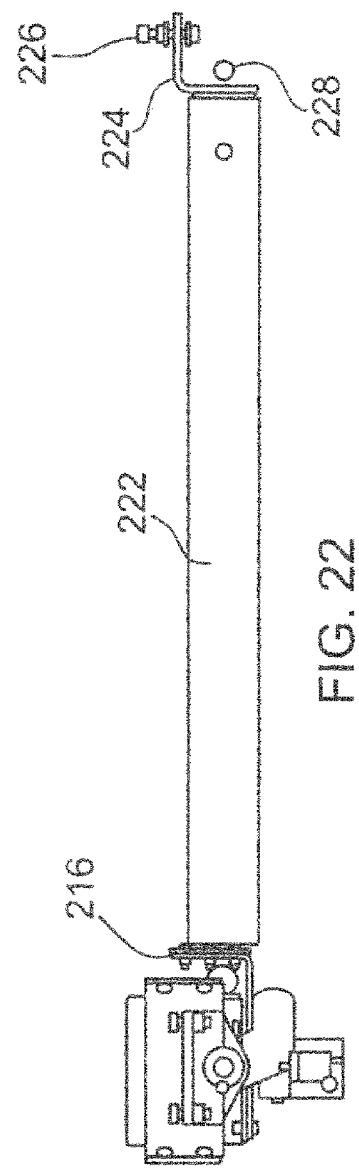

STEERING SYSTEM AND METHOD FOR TRAIN VEHICLE

CROSS-REFERENCE TO RELATED APPLICATIONS

This application claim priority to U.S. Patent Application 61/590,370, filed on Jan. 25, 2012, and U.S. Patent Application 61/668,072, filed on Jul. 5, 2012, both of which are hereby incorporated by reference.

BACKGROUND

This invention relates to hitch apparatus for connecting or coupling together adjacent ends of two vehicles, particularly vehicles intended to be connected or coupled to other vehicles to form a train of vehicles and also relates to apparatus for measuring the position of one vehicle relative to the position of an adjacent attached vehicle.

For mining applications, it is known to provide a series of conveyors arranged in the form of a train with each conveyor unit being mounted on wheels so the conveyor system can be readily moved. Conveyor systems of this type have been developed for both use in above ground, open pit mines and also for use underground, where the amount of room available for operation of the conveyor system can be quite limited. In order that such conveyor systems can be operated in an efficient manner as the mine is operated and extended, it is desirable to have an efficient and reliable system for steering the train of conveyor vehicles as the train is moved to a new, desired position. In particular it is necessary to maintain the intake end of the conveyor train in position for delivery of ore or other mine material from a mining machine as it moves along the face of the rock or material being mined.

A well known method for mining ore from an open pit mine is to drill and then blast the face of the ore body and then use an expensive shovel excavator to transfer the ore rock or material to very large ore trucks which are also quite expensive. There is a perceived need to replace such an ore delivery system with an efficient mining machine that can deliver the ore or other mine material directly to a readily movable conveyor system that can be kept in position to receive the ore or other material from the mining machine. The movable conveyor system or train can then, if desired, deliver the ore to a long fixed conveyor system. Such a movable conveyor for a mining machine may have several advantages including a reduction in noise and dust, a lower capital cost, and the ability to transfer ore or overburden continuously, thereby improving mining efficiency and rate.

U.S. Pat. No. 5,366,059 issued Nov. 22, 1994, to Prairie Machine & Parts Mfg (1978) Ltd., describes and illustrates a conveyor system adapted for use underground which comprises a plurality of conveyor vehicles connected together in the form of a train and a steering system for steering this train. All but one of the vehicles in the train has a single pair of steerable wheels with the vehicle at the outby end of the train (that is, the end to which the mine material is being delivered) having two pairs of steerable wheels. Hydraulic actuators are used to steer each pair of wheels and there is a control mechanism for controlling and coordinating these actuators in order to set the steering angles of the wheels. This known conveyor system uses a control system that has sensors for determining the current steering angle for each pair of wheels and generating electric signal indicative thereof and memory for storing the signals as the train trams. The distance that the wheels on the train travel is also measured in this known system.

Recent U.S. Pat. No. 7,949,447 issued May 24, 2011 describes a steering system for a plurality of conveyor vehicles arranged in a train, this system being designed for use in an underground mining operation. Each conveyor vehicle has a pair of steerable wheels with the pair at one end being a selective leading pair having its steering angle determined by an operator. An electrical control system automatically steers all the wheels trailing behind the leading pair. Vehicle angle sensors measure intercar angles between adjacent vehicles and provide this information to the control system. The distance traveled by the train is determined and provided to the controller. Wheel angle sensors provide signals indicative of the currents steering angle for each wheel pair and the controller adjusts the actual steering angle to a desired angle by calculating adjustments based on the measurement inputs.

Although these known systems for steering a train of conveyor vehicles are satisfactory, particularly for use in an underground mine, there is a need for an improved system for steering and controlling conveyor vehicles which are adapted for use above ground such as in an open pit mine. In particular, there is a need in the movable conveyor industry for an improved hitch apparatus that can not only connect a steerable, self propelled trailing vehicle to a self propelled leading vehicle but which can also measure the position of the trailing vehicle relative to the leading vehicle in order to provide details of this position to a steering system for the vehicles.

SUMMARY

According to one example embodiment, there is provided a hitch apparatus for connecting a self-propelled trailing vehicle to a self-propelled leading vehicle, and for measuring the position of the trailing vehicle relative to the leading vehicle. The hitch apparatus includes a first hitch assembly for connecting a rear end of the leading vehicle to a front end of the trailing vehicle, the first hitch assembly including a swivel base mounted on a substantially vertical pivot shaft and a housing, in which the shaft is pivotally mounted, adapted for mounting at the rear end of the leading vehicle; a first angle sensor connected to and supported by the housing, the first angle sensor being operatively connected to the pivot shaft and capable of measuring a horizontal angle between a centerline of the swivel base extending through the pivot shaft and a longitudinal centerline of the leading vehicle, the first angle sensor capable of transmitting an electrical signal indicative of a measured horizontal angle to a control system; a second hitch assembly for mounting on the front end of the trailing vehicle, the second hitch assembly including a connecting device mounted on the front end of the trailing vehicle and connectable to the swivel base during use of the apparatus; and a distance sensor for measuring a variable distance between a preselected point at the front end of said trailing vehicle and the swivel base and transmitting an electrical signal indicative thereof to the control system.

In some examples, the second hitch assembly includes a horizontally extending swivel bracket having a pivot mechanism for mounting the swivel bracket for pivotal movement about a substantially horizontal axis extending transversely of a longitudinal axis of the trailing vehicle. The connecting device is mounted on the swivel bracket and being pivotal about a substantially vertical axis. The hitch apparatus includes a second angle sensor adapted for mounting on the trailing vehicle, operatively connected to the pivot mechanism and capable of measuring a vertical angular position of the swivel bracket relative to the trailing vehicle and transmitting an electrical signal indicative thereof to the control system.

In some examples, the hitch apparatus includes a third angle sensor for measuring a horizontal angular position of the connecting device relative to the trailing vehicle and transmitting an electrical signal indicative of thereof to the control system.

According to one embodiment of a hitch apparatus constructed in accordance with the present disclosure, a hitch apparatus for connecting a steerable, self propelled trailing vehicle to a self propelled leading vehicle and for measuring the position of the trailing vehicle relative to the leading vehicle in order to provide details of the position to a steering system for the vehicles includes a first hitch assembly for connecting the rear end of the leading vehicle to a front end of the trailing vehicle. This hitch assembly includes a swivel base mounted on a substantially vertical pivot shaft and a housing in which the shaft is pivotally mounted. This housing is adapted for mounting at the rear end of the leading vehicle. There is also a first angle sensor connected to and supported by the housing, this angle sensor being operatively connected to the pivot shaft and capable of measuring a horizontal angle between a center line of the swivel base extending through the pivot shaft and a longitudinal centreline of the leading vehicle. The hitch apparatus also has a second hitch assembly for mounting on the front end of the trailing vehicle, this assembly including a horizontal extending swivel bracket having a pivot mechanism for mounting the swivel bracket for pivotal movement about a substantially horizontal axis extending transversely to a longitudinal axis of the trailing vehicle. The second hitch assembly has a pivotal connecting device mounted on the swivel bracket and connectable to the swivel base during use of the apparatus. The connecting device is pivotal about a substantially vertical axis. There is also a second angle sensor adapted for mounting on the trailing vehicle, operatively connected to the pivot mechanism, and capable of measuring a vertical angular position of the swivel bracket relative to the trailing vehicle and transmitting an electrical signal indicative thereof to the steering system. The hitch apparatus also has means for measuring a horizontal angular position of the pivotal connecting device relative to the trailing vehicle and transmitting an electrical signal indicative of a horizontal intercar angle between longitudinal central axes of the two vehicles to the steering system and means for measuring a variable distance between a preselected point at front end of the trailing vehicle and the swivel base and transmitting an electrical signal indicative thereof to the steering system.

According to one example version of this hitch apparatus, the measuring mechanism for determining the horizontal angular position of the pivotal connecting device comprises a third angle sensor mounted on the swivel bracket and having an input shaft operatively connected to the pivotal connecting device so that pivotal horizontal movement of the latter is transmitted to the input shaft.

According to one example, there is provided a steering system for controlling a steerable, self-propelled vehicle for travelling in an end-to-end series of steerable, self-propelled vehicles. The vehicle includes a plurality of individually controllable propelling devices connected at a generally vertical pivot to an axle of the vehicle. The steering system includes: an angle sensor for detecting an inter-vehicle angular position between two of the vehicles and providing a corresponding signal indicative thereof; a distance sensor for detecting an inter-vehicle distance between two of the vehicles and providing a corresponding signal indicative thereof; and a controller system. The controller system is configured to: receive the signals from the angle sensor and the distance sensor, control a speed of each propelling device based on the inter-vehicle distance, and control an angle of each propelling device based on the inter-vehicle angular position.

According to one example, there is provided a method for controlling a steerable, self-propelled vehicle for travelling in an end-to-end series of steerable, self-propelled vehicles. The vehicle includes a plurality of individually controllable propelling devices connected at a generally vertical pivot to an axle of the vehicle. The method includes detecting an inter-vehicle angular position between two of the vehicles; detecting an inter-vehicle distance between two of the vehicles; controlling a speed of each propelling device based on the inter-vehicle distance; and controlling an angle of each propelling device based on the inter-vehicle angular position.

In some examples, the angle sensor and the distance sensor detect in relation to at least one of a leading vehicle and a trailing vehicle.

In some examples, the controlled speed and angle of one or more front propelling devices are dependent on the signals in relation to the leading vehicle.

In some examples, the controlled angle of one or more rear propelling devices are dependent on the signals in relation to the trailing vehicle.

In some examples, the controlled angle of one or more rear propelling devices are controlled to angle opposite of the detected inter-vehicle angle.

In some examples, the angle is controlled independent of the detected inter-vehicle distance.

In some examples, the controller system is further configured to send information corresponding to the received signals to another controller system for control of another vehicle.

In some examples, the distance sensor includes at least one of a wireless transmitter and a wireless receiver.

In some examples, the angle sensor includes at least one of a wireless transmitter and a wireless receiver.

In some examples, the angle sensor detects at least one of a horizontal inter-vehicle angle and a vertical inter-vehicle angle.

In some examples, the steering system includes a hitch assembly pivotally connecting the vehicle to the leading or trailing vehicle.

According to one example, there is provided a non-transitory computer-readable medium containing instructions stored thereon executable by a processor for controlling a steerable, self-propelled vehicle for travelling in an end-to-end series of steerable, self-propelled vehicles, the vehicle including a plurality of individually controllable propelling devices connected at a generally vertical pivot to an axle of the vehicle. The instructions include: instructions for receiving a signal indicative of an inter-vehicle angular position between two of the vehicles; instructions for receiving a signal indicative of an inter-vehicle distance between two of the vehicles; instructions for controlling a speed of each propelling device based on the inter-vehicle distance; and instructions for controlling an angle of each propelling device based on the inter-vehicle angular position.

Further features and advantages will become apparent from the following detailed description taken in conjunction with the drawings, which illustrate an exemplary embodiment.

BRIEF DESCRIPTION OF THE DRAWINGS

FIG. 4 is a plan view of the conveyor vehicle of FIG. 1;

FIG. 5 is a front view of the conveyor vehicle;

FIG. 6 is a perspective view taken from below showing a first hitch assembly mountable at a rear end of the vehicle of FIG. 1;

FIG. 7 is a bottom view of the hitch assembly of FIG. 6;

FIG. 8 is a side view of the hitch assembly of FIG. 6;

FIG. 9 is a cross-sectional elevation taken along the line IX-IX of FIG. 8;

FIG. 21 is a top view of the hitch apparatus of FIG. 19;

FIG. 22 is a longitudinal side view of the hitch apparatus;

DETAILED DESCRIPTION OF EXEMPLARY EMBODIMENTS

Figure 1:
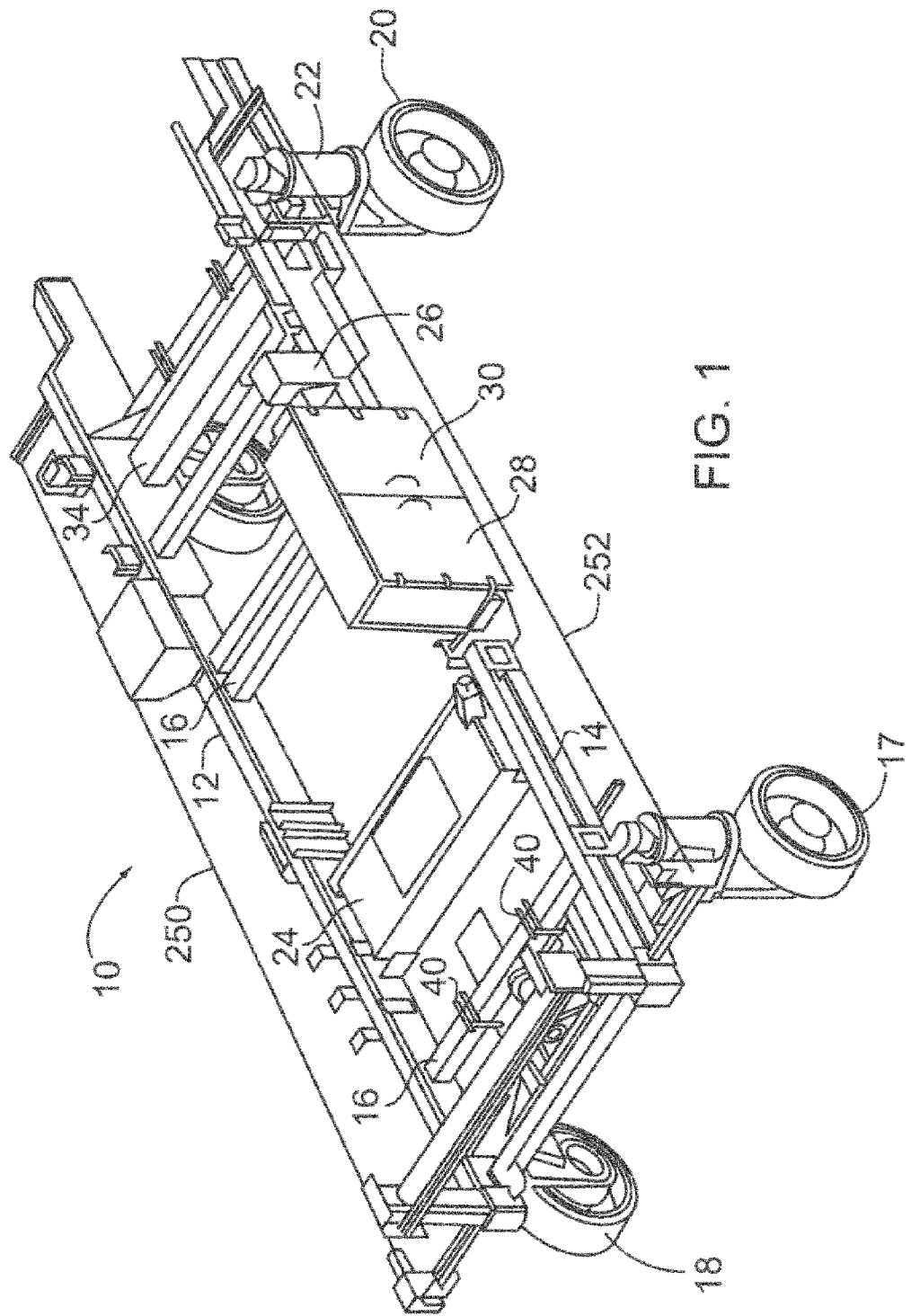
FIG. 1 is a perspective view of a conveyor vehicle constructed in accordance with the invention, this view omitting the continuous conveyor belt mounted on top of the vehicle and the rollers for supporting this belt.

Shown in FIGS. 1 to 5 is a steerable, self-propelled vehicle 10 which is intended for use as a conveyor vehicle that is one of many such vehicles in a conveyor train. The actual conveyor belt and the rollers for supporting same are not shown in these figures for ease of illustration but these items can be of standard construction. Although a vehicle intended for use as a conveyor vehicle has been shown in these figures and is described hereinafter, it will be appreciated by those skilled in the vehicle art that the hitching apparatus described hereinafter can be used on other types of vehicles designed for attachment in an end-to-end fashion and for movement together in a coordinated manner.

The illustrated vehicle 10 has two longitudinally extending main frames 12 and 14 which can be rigid, steel beams. These main frames are rigidly connected together by a series of transverse connecting frames 16. Rotatably mounted on the vehicle adjacent respective corners are four solid rubber wheels 17 to 20 which are self-propelled wheels in an exemplary embodiment, these wheels each being driven by a hydraulic planetary wheel drive in a known manner. Each wheel is part of a wheel assembly which includes a hydraulic rotary actuator 22 that can be used to steer the wheel in a coordinated manner using a programmable logic controller (PLC) 36 (FIG. 26) for the steering control system. In one embodiment the wheels have a diameter of 24 inches and are 10 inches wide. Also each rotary actuator 22 is provided with a steering sensor of known construction to measure the angle that each wheel steers. Output data from these sensors is used by the steering control system. As understood in the art, the PLC 36 includes a process which can execute instructions stored on a transitory or non-transitory computer-readable medium.

The vehicle 10 can be equipped with a hydraulic tank assembly 24 for storing a supply of hydraulic oil used to steer and drive the vehicle and an inclinometer enclosure assembly 26. Mounted midway along the main frame 14 is an electrical panel assembly 28 which can be fitted with two hinge doors 30 to cover the outer side of the assembly. Located at the outby end or rear end of the vehicle is an outby axle weldment 32 that extends between the two wheels 17 and 18. Two of the hydraulic actuators 22 are mounted with four bolts to a respective one of the ends of the weldment 32. Each rotary actuator 22 has a king pin weldment 63 bolted to its bottom end. The wheel and its drive are bolted onto their respective weldment 63. Located at the opposite end of the vehicle and extending between and connected to the main frames 12 and 14 is an inby wheel unit mount weldment 34. The outby axle weldment is pivotally and centrally mounted in an exemplary version of the vehicle in order that the vehicle can accommodate uneven ground without inducing undue stress into the frame, but the inby weldment is rigidly mounted to the main frames of the vehicle.

Figure 14:
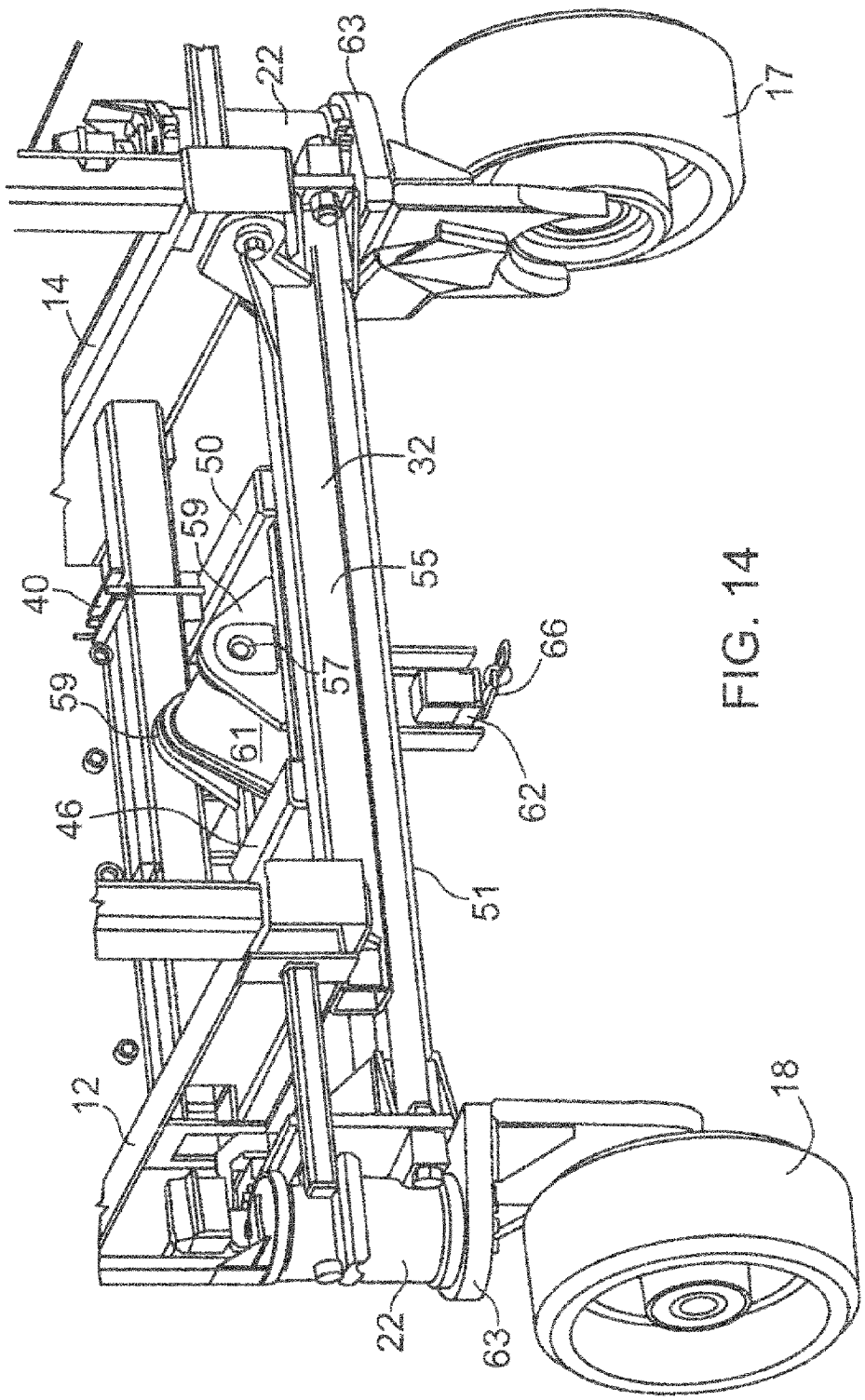
FIG. 14 is a detail view in perspective illustrating the outby axle assembly and its mounting, this view being taken from above and the rear.

The hitch assembly for the outby end of the vehicle (described in detail hereinafter) is connected to a transverse connecting frame 16 by means of two frame clamp bars 40. Extending downwardly from each clamp bar are two threaded rods located on opposite sides of the connecting frame 16. These rods are connected at their bottom to two relatively short, parallel frame members 46, 50 which are part of the axle support frame or weldment for the outby axle. Shown clearly in FIG. 14 is the outby axle weldment 51 which is pivotally mounted at its center to the axle support frame 53 which includes transverse frame member 55. The frame member 55 is rigidly connected at its two ends to main frames 12 and 14. Mounted centrally on the axle support frame is an axle pivot pin 57 that extends between two brackets 59. The pivot pin extends through a suitable bearing (not shown) which pivotally supports an axle connector 61. The pivot pin and axle connector 61 support the weight of the conveyor vehicle at the outby end.

Located at the inby end of the vehicle (see FIG. 5) are two vertically extending inby end "soft hitch" weldments 52 and 54 and mounted on these weldments is an inby end "soft hitch" assembly 56. This "soft hitch" assembly can be seen more clearly in FIGS. 10 to 12. The weldments 52, 54 are supported at their tops by frame clamp bars 58. Extending vertically downwardly from these clamp bars are threaded support rods 60. These rods extend downwardly on opposite sides of the forwardmost connecting frame 16.

Figure 15:
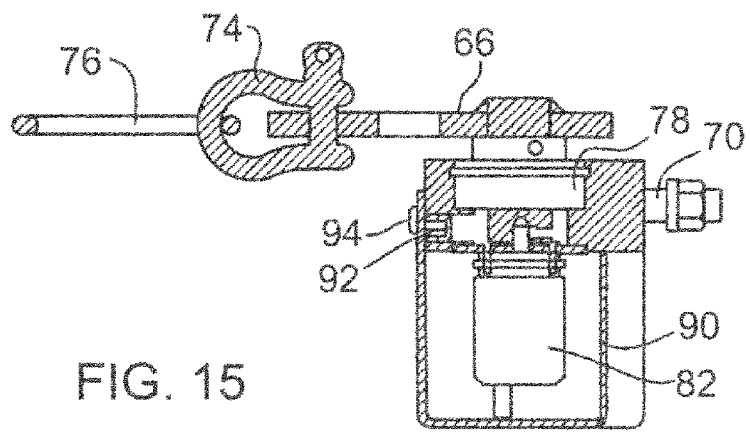
FIG. 15 is a cross-sectional elevation of the hitch assembly of FIGS. 6 and 7, this view being taken along the line XV-XV of FIG. 7.

Turning now to the first "soft hitch" assembly located at the rear or outby end of the vehicle 10, this assembly is illustrated in FIGS. 6 to 9 and FIG. 14. This hitch assembly indicated generally at 62 has a bearing housing 64 on which is pivotally mounted a horizontal angle sensor swivel base 66. The swivel base is mounted on a substantially vertical pivot shaft 68. This shaft is pivotally mounted in the bearing housing 64. The housing 64 is attached by two bolt and nut combinations 70 to the center of the outby axle weldment 51. A detachable U-connector 72 is connected to the outer end of the swivel base 66 by means of a pin 74. Attached to the U-connector is a carabiner or connecting loop 76. A suitable bearing for the shaft 68 is located at 78 in the bearing housing. This bearing is held in place by a retaining ring 80 which snaps into a groove formed in the bearing housing. Located at the bottom end of the pivot shaft is a first angle sensor 82 having an input shaft 84 at its top end. This shaft extends into and is connected to the pivot shaft 68 so as to rotate therewith. The angle sensor 82 can be an absolute magnetic rotary analog encoder having a mounting flange 86 at its upper end. This flange is connectable to the bearing housing 64 by means of four machine screws 88. The sensor 82 is covered and protected by sensor cover 90. Visible in FIG. 15 and mounted in one side of the bearing housing is a removable pipe plug fitting 92 which can be removed to enable tightening or loosening of a set screw that secures the angle sensor 82 to its shaft. The sensor cover 90 can be attached to the bearing housing by two machine screws 94, one of which is visible in FIG. 15. It will be understood that the first angle sensor 82 which per se is of known construction is capable of measuring a horizontal angle between a centre line A of the swivel base (see FIG. 7) which extends through the pivot shaft 68 and a longitudinal centerline of the vehicle which is forwardly positioned in the train, that is, the leading vehicle. As the raw data from the first angle sensor 82 may measure the horizontal angle between the housing 64 and the pivotal connecting device 104, such raw data may be readily accounted for when accounting for the horizontal angle between the centre lines of the vehicles.

Optionally the swivel base can be provided with a central slot 67 which provides a method of fixing a tongue slide 222 (described below) to the swivel base so that a more accurate or consistent hitch angle measurement can be provided to the control system, if needed. This fixing can, for example, be carried out by means of a suitable tab on a variation of the slide guard shown in FIG. 19. The tab or similar feature is engaged in the slot 67 to fix the position of the swivel base relative to the tongue slide of the hitch.

The soft hitch assembly 56 illustrated in FIGS. 10 to 14 mounted on the inby end of the conveyor vehicle has the capability of measuring two separate angles as explained hereinafter in addition to a distance measurement. This hitch assembly includes a horizontally extending swivel bracket 100 having a pivot mechanism 102 for mounting the swivel bracket for pivotal movement about a substantially horizontal axis B extending transversely to a longitudinal axis of the trailing vehicle. This hitch assembly 56, which can be termed the second hitch assembly, includes a pivotal connecting device 104 mounted on the swivel bracket and connectable to the above described swivel base 66 of the first hitch assembly. The connecting device 104 is pivotal about a substantially vertical axis.

Figure 10:
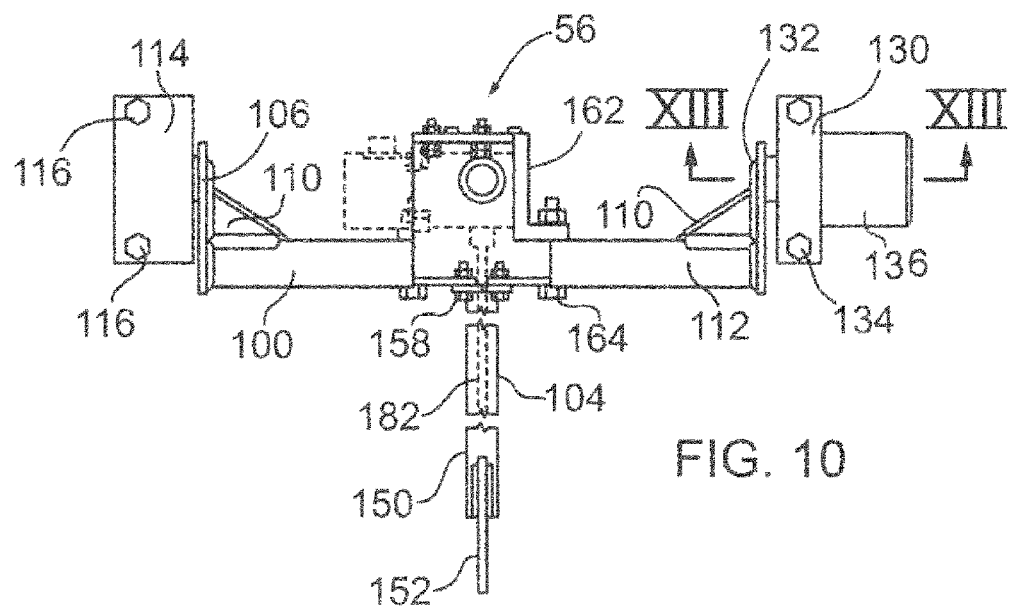
FIG. 10 is a top view of a second hitch assembly adapted for mounting on a front end of the vehicle of FIG. 1.
Figure 11:
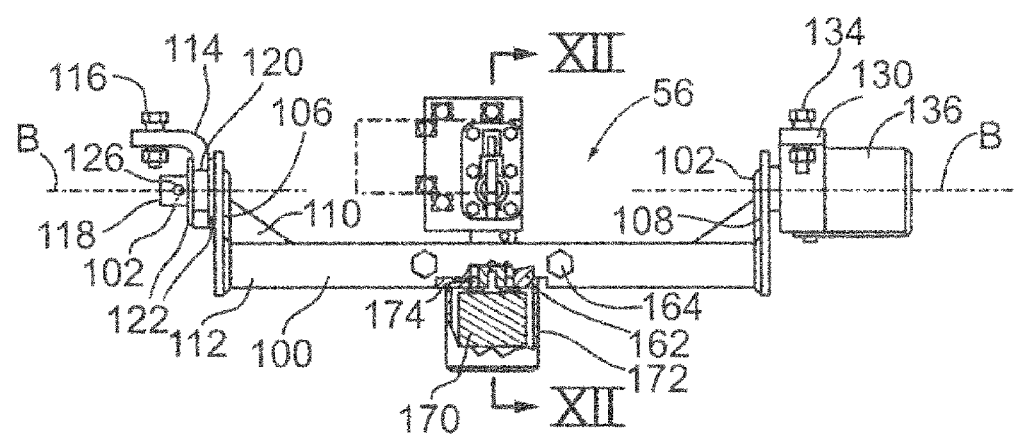
FIG. 11 is a front view of the hitch assembly of FIG. 10.

The pivot mount for the swivel bracket 100 includes two mounting plates 106, 108 located at opposite ends of the bracket. A welded triangular plate 110 can be used to strengthen the connection between each of these mounting plates and a swivel frame member 112. Mounted on the left hand end of the bracket as seen in FIGS. 10 and 11 is a horizontal swivel plate 114 which is bent 90 degrees. This plate can be mounted at the inby end of the vehicle by means of two bolt and hex nut combinations 116. Extending through the swivel plate is a stub shaft 118 which is pivotally mounted in the plate by means of a suitable bushing 120. Arranged on the stub shaft on opposite sides of the swivel plate are two flat washers 122. In order to hold the outer washer 122 in place, a cotter pin 126 can be provided, this pin extending through the stub shaft.

The pivot mechanism for mounting the swivel bracket also includes a pivot mount for the right hand end of the swivel bracket as seen in FIGS. 10 and 11. This pivot mount includes a bearing housing 130 through which extends a horizontal pivot pin 132. The bearing housing can be mounted at the inby end of the vehicle by means of two bolt and hex nut combinations 134. Mounted on the outer surface of the bearing housing is a sensor cover 136 in which is mounted a further angle sensor 138 visible in the cross-section of FIG. 13. The angle sensor can be a positional transducer or encoder of known construction per se. The input shaft of the sensor is fixedly connected to the pivot pin 132. This sensor is capable of providing an electronic signal to the steering system for the vehicle indicative of the angle of the swivel bracket about the horizontal pivot axis B. The pivot pin 132 is pivotally supported in a bearing located at 140.

The bearing can be held in place in the bearing housing by a retainer ring 146. A removable pipe plug fitting 148 can be mounted in the bottom of the housing. The fitting 148 can be removed to enable tightening or loosening of the set screw 142. The pivot pin 132 can be fixedly attached to the input shaft of the angle sensor 138 by means of the set screw 142. The side of the sensor 138 can be mounted on the outer side of the bearing housing by means of screws 144. One suitable form of angle sensor is a Postal/Fraba Rotary Encoder, P/W MCD-AC005-0012-5060-CAW-DEG-180.

The aforementioned pivot connecting device 104 in an exemplary version includes an elongate outer tube 150 on which is mounted a swivel connecting plate 152 having a connecting hole 154. The connecting plate 152 can be connected to the loop connector 76 of the hitch assembly shown in FIGS. 6 and 7. Extending into the outer tube 150 is a telescoping inner tube 156 which can be seen in FIG. 12. This inner tube is connected by two or more bolts and hex nut combinations 158 to a mounting bracket 160 in the form of a U-shaped plate. Lock washers can be used to secure the nut and bolt combinations 158. Mounted along the central section of the swivel bracket is a bearing housing 162. It is mounted by a combination of bolts, hex nuts and lock washers at 164 to the swivel frame member 112.

Figure 12:
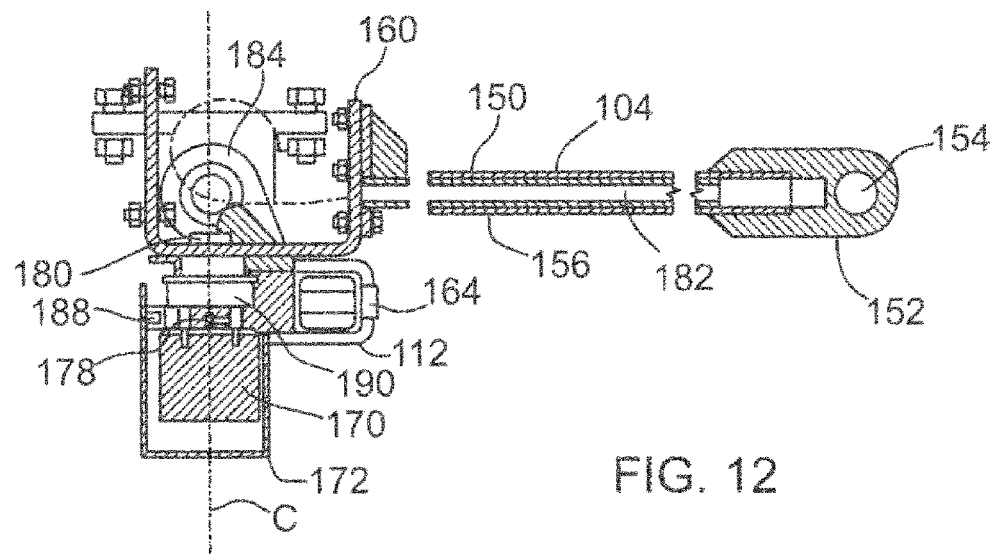
FIG. 12 is a cross-sectional elevation taken along the line XII-XII of FIG. 11.
Figure 13:
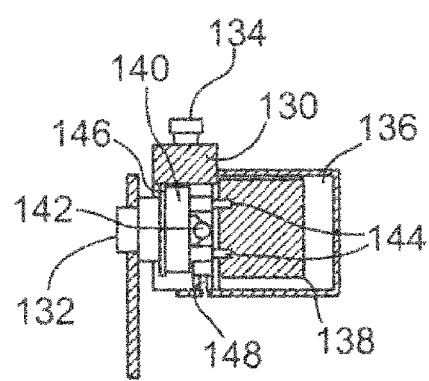
FIG. 13 is a cross-sectional elevation taken along the line XIII-XIII of FIG. 10.

Mounted below the swivel frame member 112 is a third angle sensor 170 visible in FIGS. 11 and 12. If desired, this angle sensor can be the same type as the angle sensor 138 shown in FIG. 13. The sensor is enclosed by and protected by a sensor cover 172 which is mounted on the bottom side of the bearing housing 162. The angle sensor 170 is mounted on the bearing housing by means of screws 174. The input shaft of the angle sensor at 178 is connected to a stub shaft 180 which is used to pivotally support the mounting bracket 160 and the attached connecting device 104. The shaft 180 is welded to the bracket 160. The stub shaft 180 is mounted in a bearing located at 190. A removable pipe plug fitting 188 can be provided to enable access to a set screw that secures the angle sensor 170 to the shaft.

Extending through the center of the connecting device 104 is a wire cable 182 which is attached at one end to the outer tube 150 and which is connected at its inner end to a spring loaded reel 184. The reel is mounted on the mounting bracket 160 so that both the reel and the connecting device 104 can pivot about the substantially vertical axis indicated at C in FIG. 12. The size of the horizontal angle through which the connecting device 104 is pivoted is measured by the third angle sensor 170.

The wire cable 182 is part of a string potentiometer wherein the number of turns of the cable on the reel provide a basis for calculating the length or distance that the cable has been extended by outward movement of the outer tube 150. In one particular embodiment of this potentiometer, a distance of up to 60 inches can be measured. Thus, the string potentiometer including the reel 184 provides means for measuring a variable distance between a preselected point along the vertical axis C and the swivel base 66 and for transmitting an electrical signal indicative thereof to the steering system for the vehicle. It will be further understood that the third angle sensor 170 is capable of transmitting an electrical signal indicative of a horizontal intercar angle formed between longitudinal central axes of the leading and trailing vehicles connected by the telescoping device 104.

Figure 16:
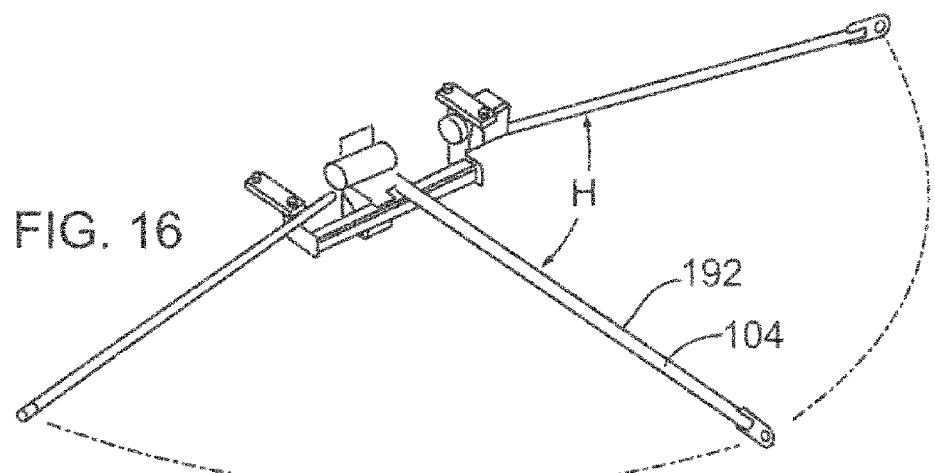
FIG. 16 is a perspective view of the hitch assembly of FIG. 10 showing the operation of the intercar angle sensor.
Figure 17:
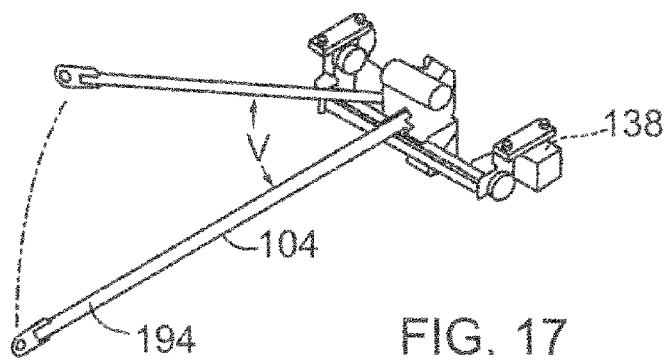
FIG. 17 is another perspective view of the hitch assembly of FIG. 10 showing its ability to measure intercar pitch.

FIGS. 16 and 17 illustrate the two angular motions through which the pivotal connecting device 104 can pivot during operation of the conveyor vehicles. FIG. 16 illustrates the horizontal pivotal movement from a central position indicated at 192. FIG. 17 illustrates the vertical pivotal movement from the straight ahead position indicated at 194. In FIG. 16, the horizontal angle that is measured by the angle sensor is represented by the angle H. In FIG. 17, the vertical angle that is measured by the angle sensor at 138 is represented by angle V. It will be understood that electrical signals indicative of both of these angles are provided to the steering control system for the vehicle along with additional relevant data such as the distance traveled by the vehicle in order to steer the vehicle as required not only to move the vehicle to a new position but also to ensure that the material conveyed to the conveyor belt on the vehicle is dropped at the correct location on the conveyor belt.

One significant function of the hitch apparatus described above is to enable the conveyor vehicles to follow one another such that the ore or other material that the conveyor vehicles are transferring is correctly transferred from the outby end of one car to the inby end of the next car. In order to do this, correct positioning of each vehicle must be accomplished so that the ore trajectory is lined up with a theoretical hitch center pivot point (THC) located towards the inby end of the car, in line with the inby axle of the vehicle, and at the center of the vehicle. The present hitch apparatus provides output in the form of electrical signals to a vehicle control system which includes both its drive system and its steering system so that this vehicle control system will know if the vehicle needs to be moved inby, outby, right or left.

To make the aforementioned proper positioning of each vehicle possible, each vehicle is fitted with not only the above described hitch apparatus but also a hydrostatic power transmission system and a hydraulic steering system, these systems being powered by electric motors. One method for controlling the motion of each vehicle is to consider each vehicle as having a "node" and the series of nodes formed by a train of vehicles being connected together in the manner of a chain. The node of each vehicle is located at the THC. The outby axle of each vehicle supports a portion of the weight of the vehicle and is also used to steer the outby end so that the trajectory of the ore or other material always lines up with the THC. To control the node position, three inputs are provided to the vehicle control system, including the intercar angle provide by the hitch apparatus, the distance between adjacent vehicles provided by the hitch apparatus, and the travel distance provided by wheel rotation sensors which are not described in detail herein as they are of known construction. By using these three inputs, the programmable logic controller (PLC) system causes the node of each vehicle to tram to the same position as the node of the vehicle in front of it in the direction of travel. As the train of vehicles moves along, the alignment of trajectory of ore to THC is maintained by the outby axle, the controller for which gathers input from the first hitch angle sensor 82 mounted at the outby end of the car and connected to the second hitch assembly located at the inby end of the next car. The hitch angle sensor 82 when the vehicles are operating in the exemplary manner carries the value of zero or as close to zero as possible, this value indicating that the node of the next vehicle is in line with the center of its respective car. In this desired situation, the ore or other material is transferred properly to the top of the conveyor belt at the THC.

The above described hitch apparatus illustrated in FIGS. 6 to 13 can be referred to as a soft hitch assembly that employs a string potentiometer and rotary sensors. An alternative form of soft hitch assembly is illustrated in FIGS. 18 to 25 and this version can be described as a length/angle sensor system. This system can employ a length and angle sensor unit 200 available from Kar-Tech of Delafield, Wis. This sensor is provided in a two-part housing, including a base housing 202 and a smaller, detachably connected housing section 204. Mounted in the housing but not shown in the drawings is a length/angle sensor. The length/angle sensor unit 200 is mounted on a L-bracket 206.

Figure 23:
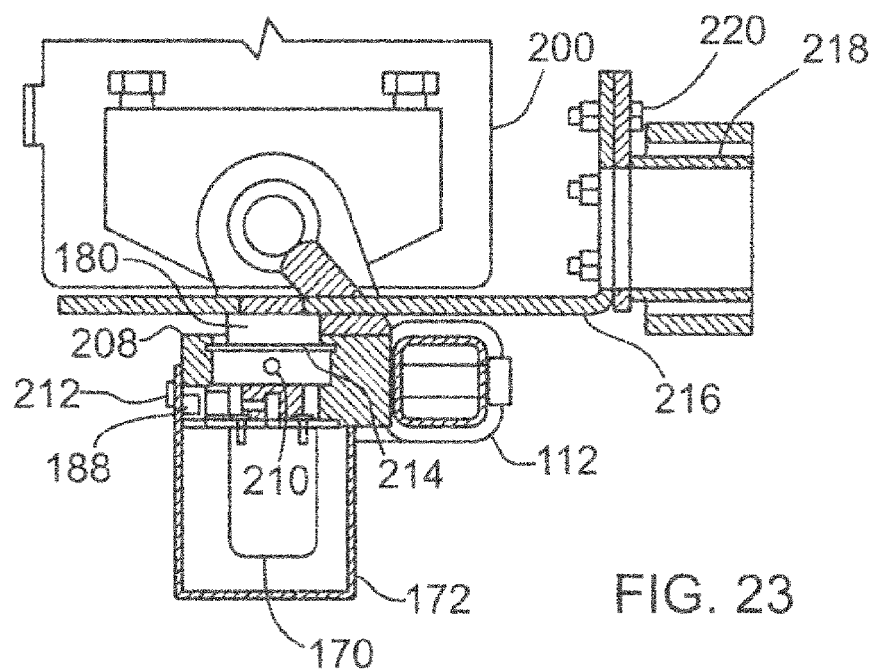
FIG. 23 is a vertical cross-section taken along the line XXIII-XXIII of FIG. 21.
Figure 24:
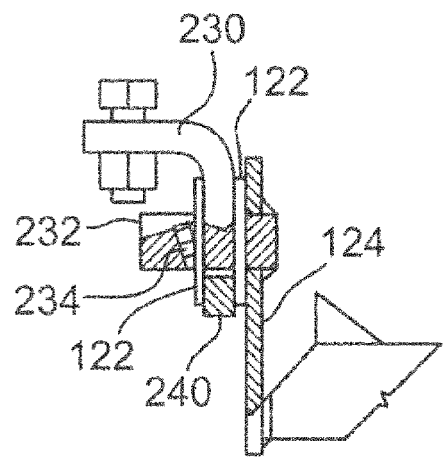
FIG. 24 is a detail view of the pivot mechanism circled in FIG. 20.

Reference will now be made to the vertical cross-section shown in FIG. 23. Arranged below the length/angle sensor unit is a bearing housing 208 which is mounted on the swivel frame member 112. Located in the bearing housing is a bearing at 210 which pivotally supports the stub shaft 180. Operatively connected to the bottom end of this shaft is the angle sensor 170 which can be the same unit as in the embodiment of FIGS. 10 to 13. Extending over the sensor is the sensor cover 172 which is detachably connected by means of two machine screws 212. Located adjacent these screws is the pipe plug fitting 188. The bearing can be held in place in the bearing housing by means of retaining ring 214. Connected to the top of the stub shaft and rotatable therewith is a mounting bracket 216. Connected to the front surface of this bracket is an elongate steel tongue slide 218, only a rear end section of which is visible in FIG. 24. A connecting flange at the rear end of this tongue slide is used to connect same by means of bolt, hex nut and lock washer combinations 220 to the mounting bracket 216. Coaxial with and extending along the length of the steel tongue slide 218 is a PVC tongue slide 222. Mounted at the end of the tongue slide 222 by means of a bolt and nut is a slide guard 224 in the form of a right angle bracket. Mounted on the horizontal leg of the slide guard is a fastener arrangement 226 that includes a bolt and two hex nuts. This fastener arrangement is used to connect the front end of the tongue slide unit to the soft hitch assembly at the adjacent end of the next vehicle (see FIG. 18). The slide guard 224 is tightly connected to the tongue slide by the bolt which is tightened to clamp the guard to the slide. When connecting the tongue slide 218 to the swivel base 66, it is possible to omit the connecting loop 66 or the U-connector 74. The fastener arrangement 226 can be connected directly to the swivel base 66, if desired.

The hitch assembly of FIGS. 19 to 24 also includes a swivel bracket 100 constructed substantially in the manner of the embodiment of FIGS. 10 to 13. The swivel bracket is mounted on two horizontal swivel carriers 230. These carriers can be bolted to a supporting structure provided at the inby end of the vehicle. Each swivel carrier is held in place by two bolts attached with hex nuts and lock washers. Mounted in each of the two swivel carriers 230 is a stub shaft 232 (see FIG. 25) which extends horizontally and is connected to the bracket end plate 124 such as by welding. Flat washers are located on opposite sides of the vertical section of each swivel carrier. A cotter pin can be provided at 234 to hold the adjacent washer in place. In the exemplary version, the stub shaft 232 extends through a tension bushing 240.

Figure 18:
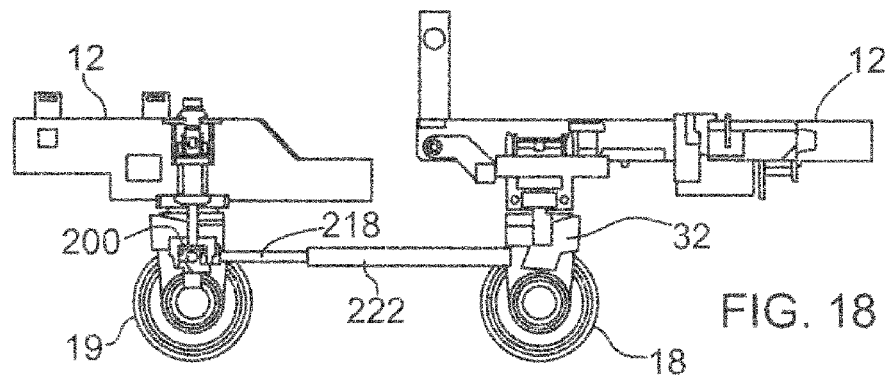
FIG. 18 is a side detail view showing adjacent vehicle end sections connected together with a second version of the hitch apparatus.

FIG. 18 shows how the soft hitch apparatus of FIGS. 19 to 24 can be used to connect together adjacent vehicles, only end sections of which are shown in the figure. The tongue slide assembly is shown in an extended position. The figure shows the slide guard 224 connected to the outby axle weldment 32 of the leading vehicle by means of the soft hitch assembly 62. The steel tongue slide 218 extends forwardly from the length and angle sensor unit 200 which is mounted on the above described swivel bracket.

Figure 25:
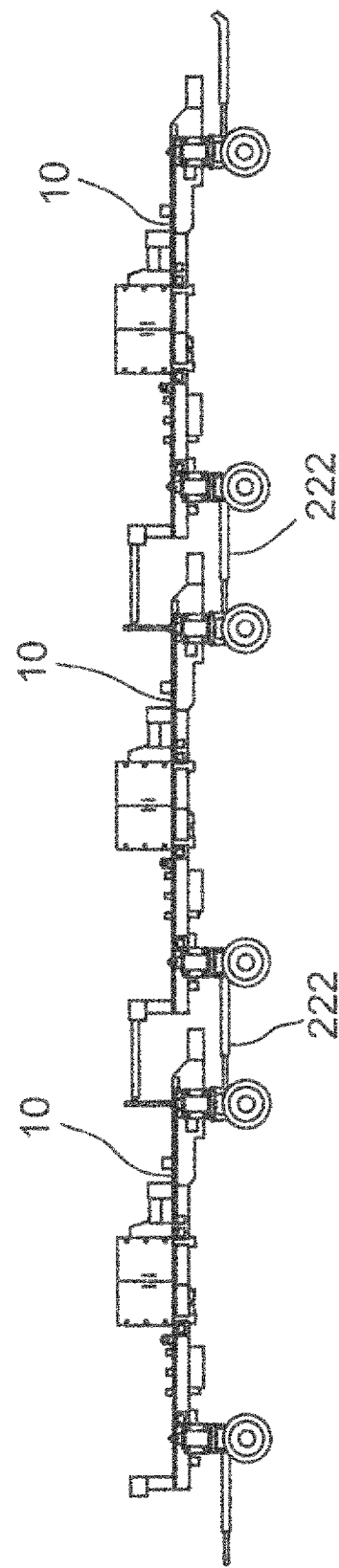
FIG. 25 is a side elevation showing three conveyor vehicles connected together with the hitch apparatus shown in FIG. 18.

FIG. 25 shows several conveyor vehicles arranged in an end-to-end fashion, these vehicles being connected together by means of the hitch apparatus constructed with the version of the hitch assembly of FIGS. 20 to 25. Although only three vehicles are shown, it will be appreciated that there can be twenty or more vehicles in a conveyor train of this type.

Figure 19:
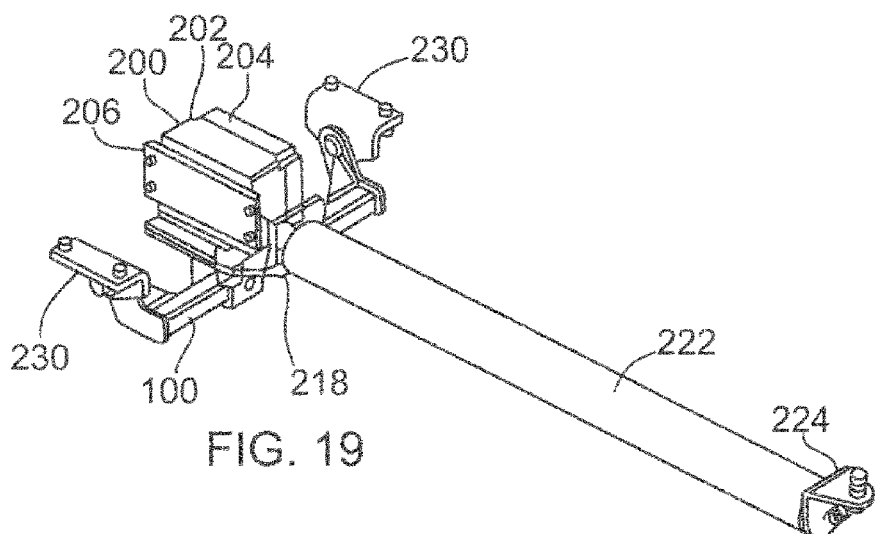
FIG. 19 is a perspective view of the second version of the hitch apparatus taken from above and from the front.
Figure 20:
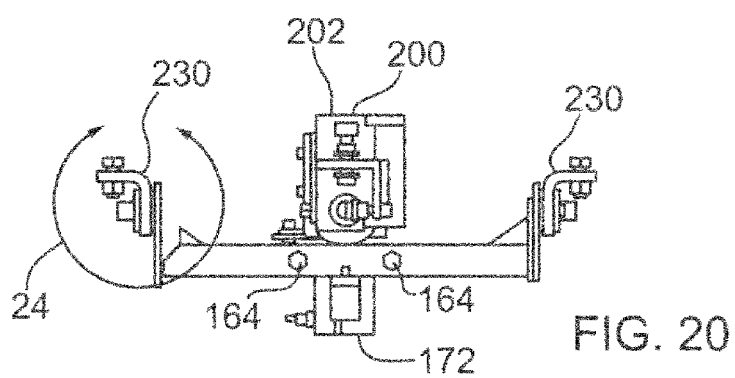
FIG. 20 is a front view of the hitch apparatus of FIG. 19.

With reference again to the length/angle sensor unit 200 illustrated in FIGS. 19 and 20, the exemplary unit available from Kar-Tech is capable of measuring its angle with respect to gravity. Accordingly, unlike the hitch assembly shown in FIGS. 10 to 13, it is unnecessary to provide an additional angle sensor mounted at one of the swivel carriers 230. This known sensor has a length measuring range from 0 to 240 inches. The sensor unit is capable of operating between −40 degrees and 85 degrees C. and it operates with a supply voltage of 9-35 VDC.

Figure 2:
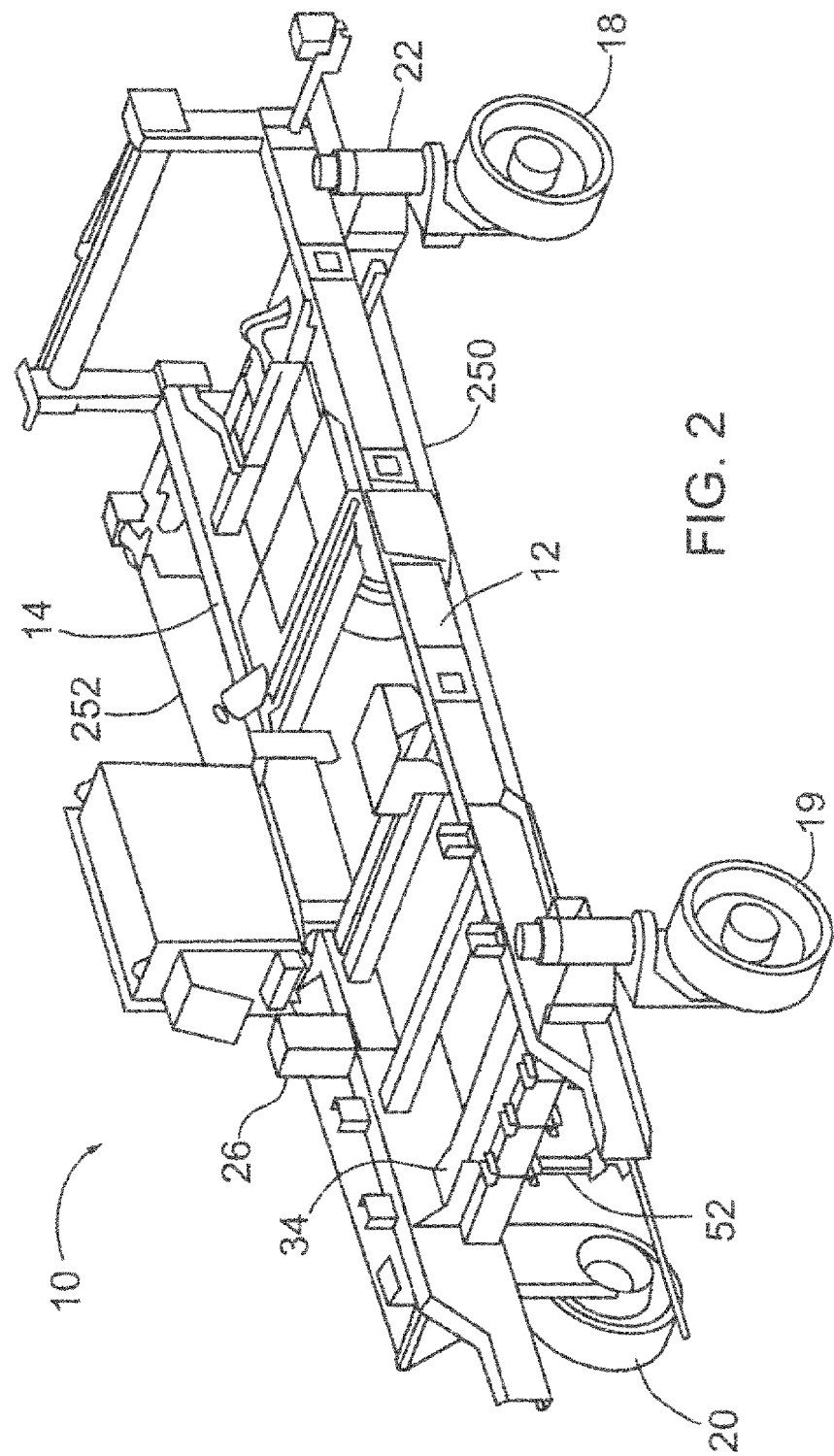
FIG. 2 is a perspective view similar to FIG. 1, but taken from the opposite longitudinal side and from the inby end or front end of the vehicle.
Figure 3:
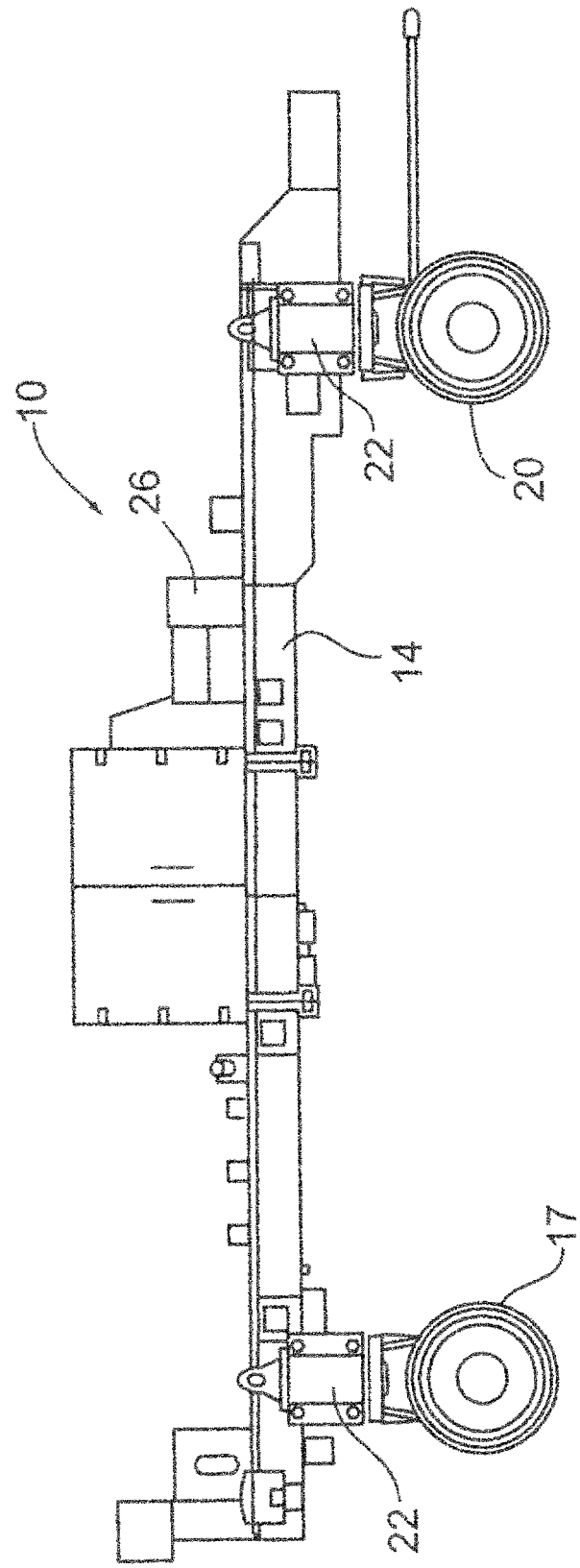
FIG. 3 is a longitudinal side view of the conveyor vehicle of FIG. 1.

FIGS. 1, 2 and 4 also show emergency stop cables 250, 252 which do not form part of the hitch assemblies of the present invention and which are therefore not necessary to describe in detail herein. These cables are provided on opposite sides of the conveyor so that an operator or other person in close proximity to the machine can quickly shut down the whole conveyor train system in case of emergency.

A significant feature of the above described "soft hitch" assemblies is that they allow for independent movement between the cars or vehicles so that one car cannot exert any significant force on the car adjacent to it. However, although this independent movement is allowed, it is desirable to limit the amount of this independent movement in any direction, for example, to no more than 6 inches and more desirably to no more than 2 inches of differential movement.

Figure 26:
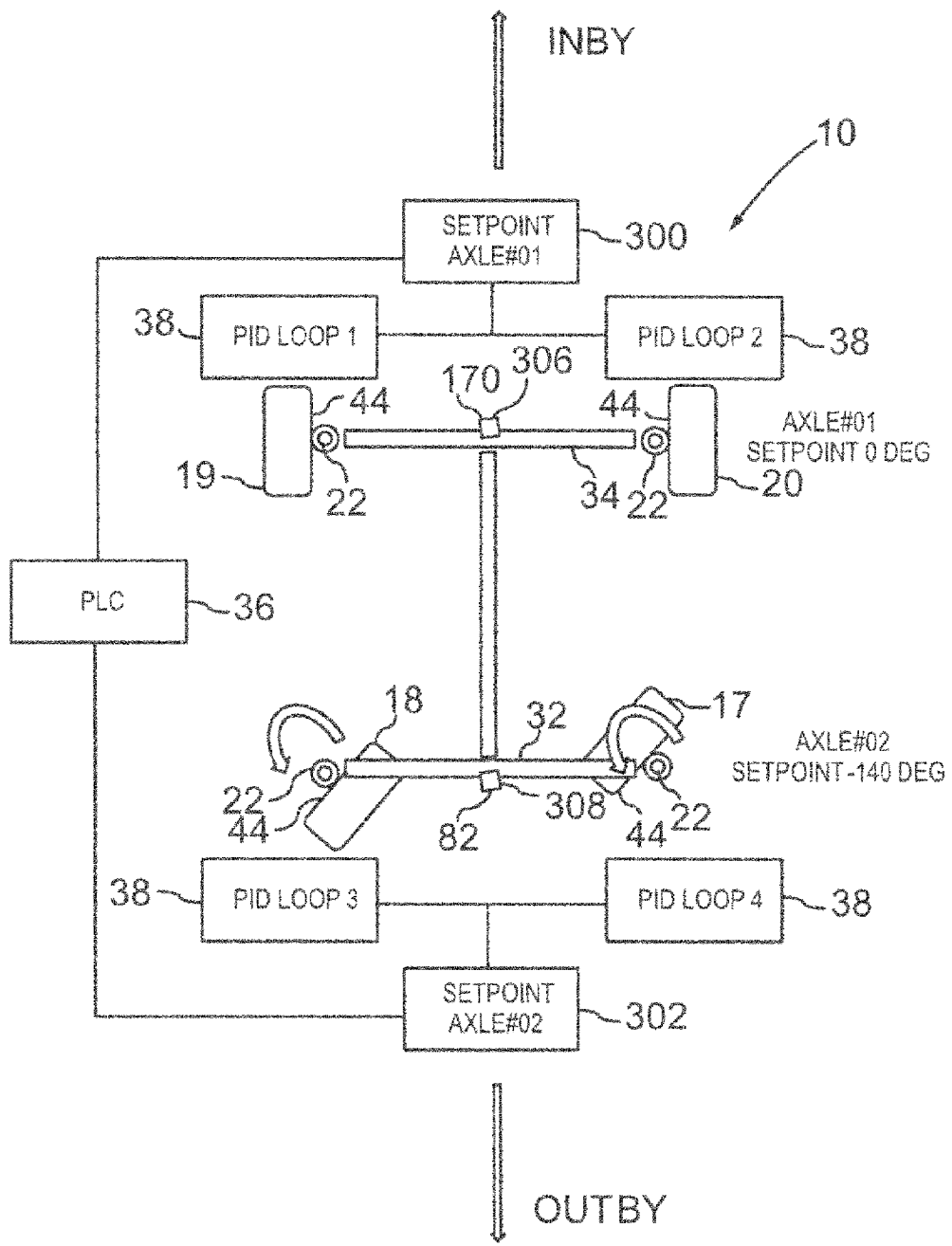
FIG. 26 is a top diagrammatic view of the conveyor vehicle of FIG. 1.

Reference is now made to FIG. 26, which illustrates a steering system for the vehicle 10 to control the speed and angle of the wheels 17 to 20, in accordance with some example embodiments. As shown, a controller such as the PLC 36 may be used to receive sensor information and use the received information to individually steer and control the angle and speed of the wheels 17 to 20. The rotary actuators 22 may be individually controlled to control the angle of the wheels 17 to 20 by dedicated PID (proportional-integral-derivative) loops 38, as understood in the art. In some example embodiments, as shown in FIG. 26, each pair of actuators 22 may be treated as a single axle using a common setpoint, shown as first setpoint axle 300 for the inby pair and second setpoint axle 302 for the outby pair. As shown in FIG. 26, in relation to the setpoint axles 300, 302, zero degrees can represent neutral rotation (e.g. straight forward), negative degree angle represents leftwardly or counter-clockwise rotation, and positive degree angle represents rightwardly or clockwise rotation.

The vehicle 10 can include a distance sensor 306 or range sensor for detecting an inter-vehicle distance between an adjacent vehicle and providing a corresponding signal indicative thereof. Similarly, the vehicle 10 can include an angle sensor 170 for detecting an inter-vehicle horizontal angular position between an adjacent vehicle at the inby end. In an example embodiment, an example combined implementation of both sensors 170, 306 is illustrated as the length/angle sensor unit 200, as available from Kar-Tech, described in detail above. Another horizontal angle sensor 82 may be provided at the outby end of the vehicle 10, for detecting an inter-vehicle angular position between an adjacent vehicle at the outby end. Another distance sensor 308 may be provided at the outby end of the vehicle 10. Generally, the PLC 36 may be configured to receive the signals from the distance sensor 306, 308 to control a speed of each wheel 17 to 20 based on the detected inter-vehicle distance, for example, to maintain a specified inter-vehicle distance. The PLC 36 may be configured to receive the signals from one or both of the angle sensors 82, 170 and individually control the angle of the setpoint axles 300, 302, for example to follow a leading vehicle or to make wheel adjustments when turning.

Figure 27:
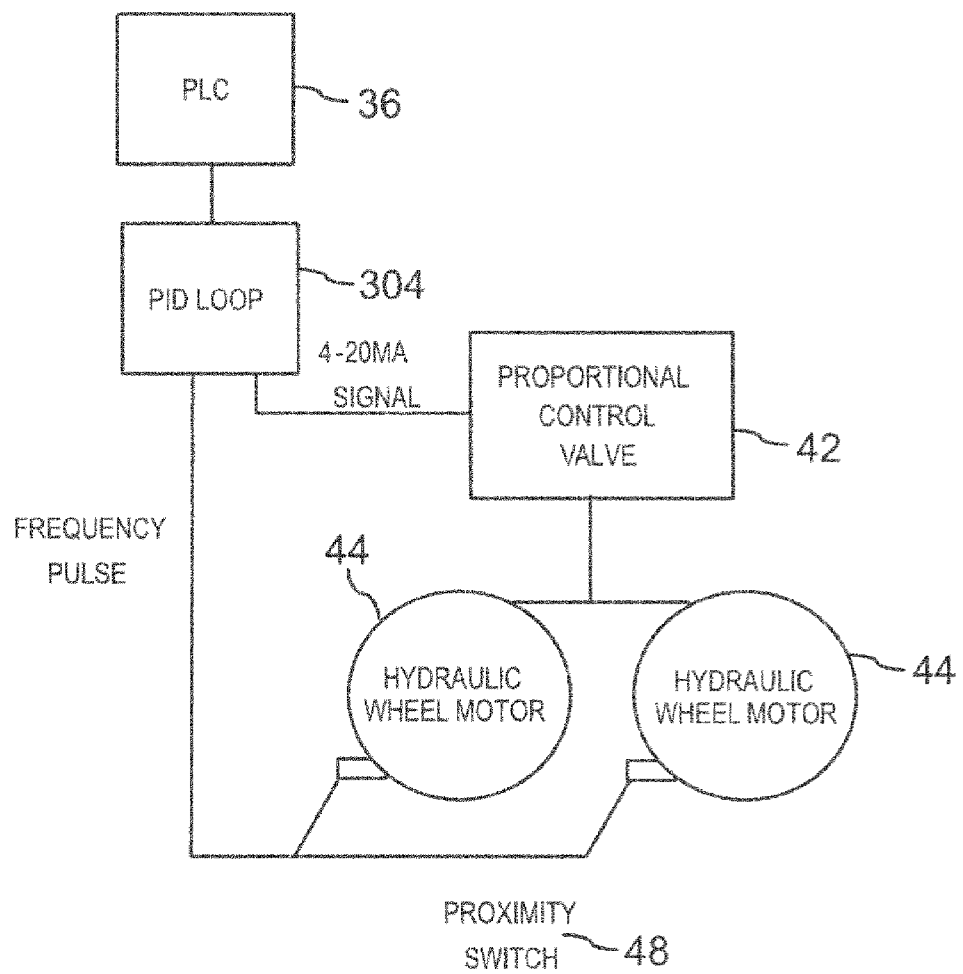
FIG. 27 is an example system diagram of individual wheel propulsion control of the conveyor vehicle of FIG. 1.

Reference is now made to FIG. 27, which shows an example system diagram for performing wheel propulsion control of the conveyor vehicle 10, to control the speed of travel of the vehicle 10. Each hydraulic wheel motor 44 is fitted with an integral proximity switch 48, which can be used to sense the wheel revolutions. This proximity switch 48 pulses on/off 2000 times per one revolution of the wheel motor 44. The wheel motor 44 is supplied with a variable flow rate of hydraulic fluid via a proportional control valve 42. Note that the same source of hydraulic fluid used for this propulsion control may also be used for axle control of the rotary actuators 22. The valve 42 may be controlled to increase or decrease the speed that the wheel 17 to 20 rotates. With the increasing/decreasing speed of rotation, the speed the proximity switch 48 pulses on and off changes. This speed of pulse can be measured and controlled as a frequency.

As shown in FIG. 27, there are two hydraulic wheel motors 44 per axle 32, 34, which may be controlled together. The speed of both these wheel motors 44 may be controlled from the same proportional valve 42. The frequency of pulses received from the proximity switch 48 of both wheel units are averaged. This average frequency is then used to control the speed of rotation of both wheel units via the PID loop 304.

Figure 28:
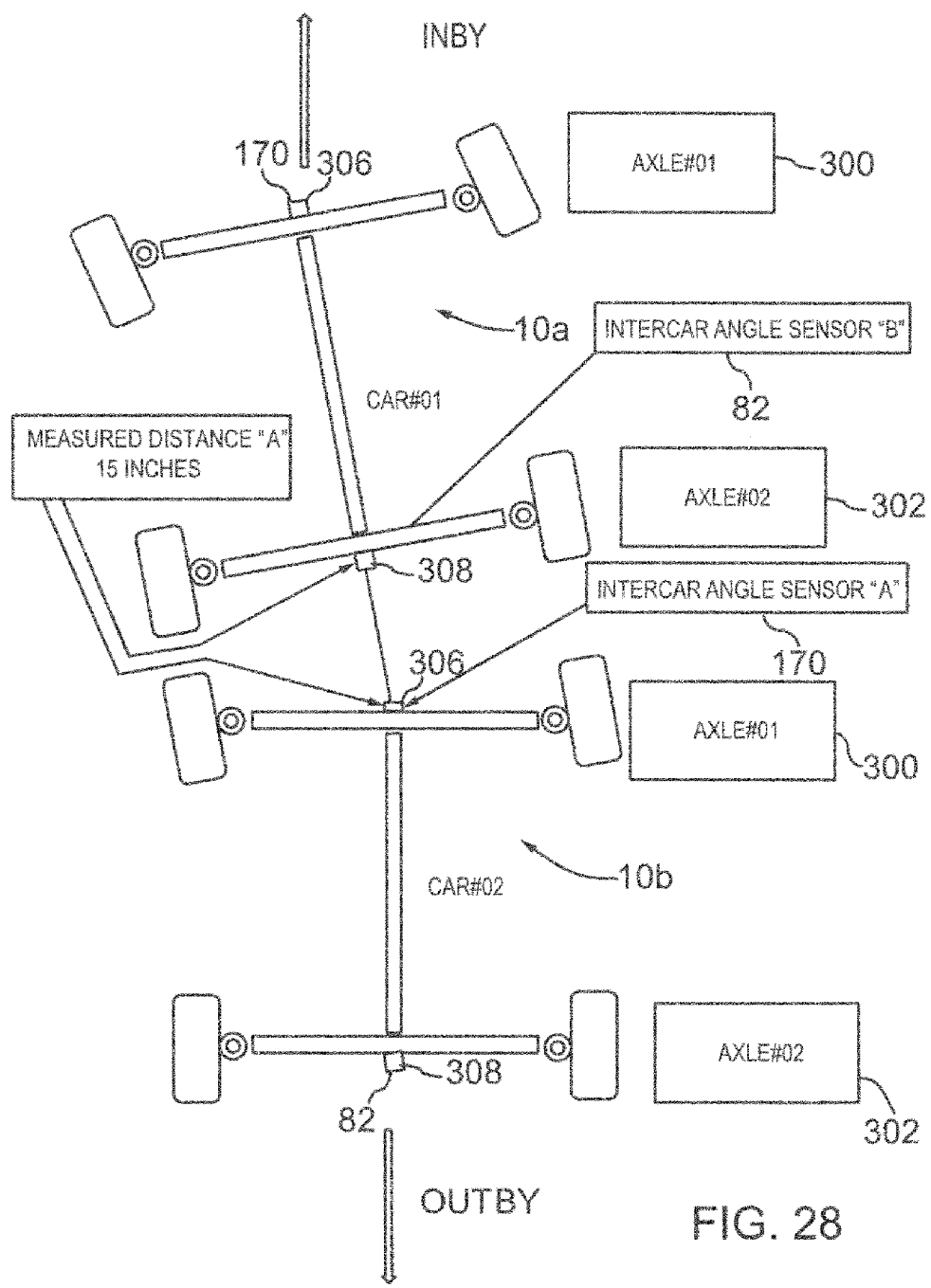
FIG. 28 is a top diagrammatic view of an end-to-end series of two vehicles.

Reference is now made to, FIG. 28 which shows a diagrammatic view of an end-to-end series of a first vehicle 10a (inby) and a second vehicle 10b (outby), in accordance with an example embodiment. Generally, signals received from the distance sensor 306, 308 may be used to control a speed of the vehicles 10a, 10b based on the detected inter-vehicle distance, for example, to maintain a specified inter-vehicle distance between the two vehicles 10a, 10b. The signals received from one or both of the angle sensors 82, 170 may be used to control the setpoint axles 300, 302.

Figure 29:
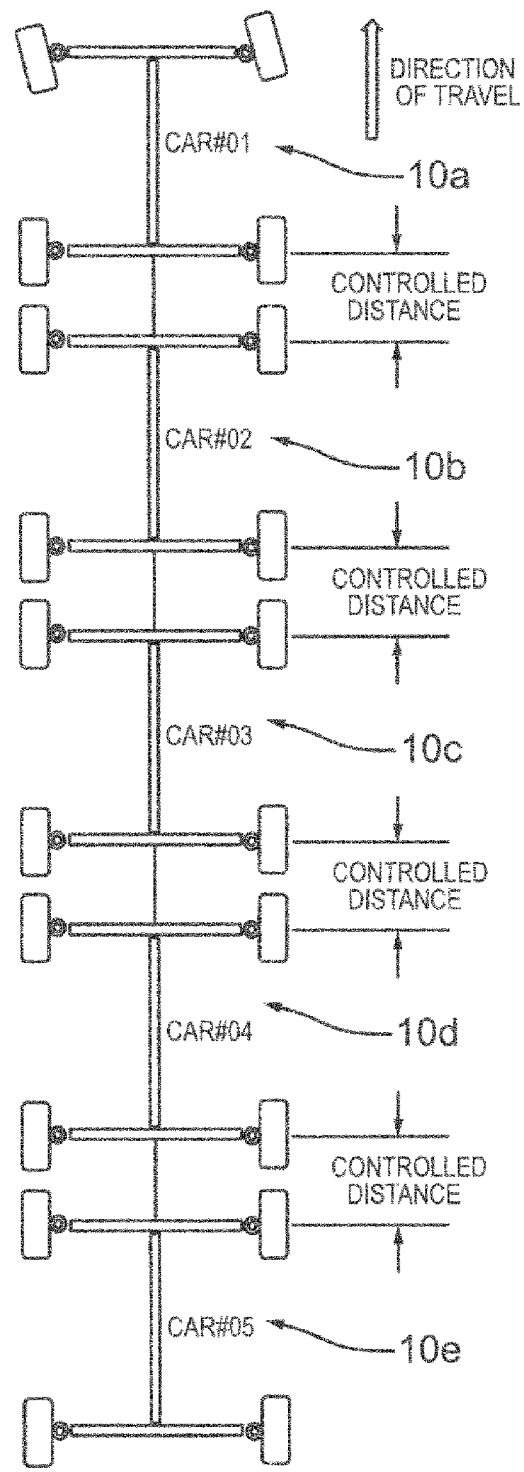
FIG. 29 is a top diagrammatic view of an end-to-end series of multiple vehicles.

FIG. 29 is a diagrammatic view of an end-to-end series of multiple vehicles. As shown, the vehicles may be referenced starting from the first vehicle 10a at the inby end, vehicles 10b, 10c, 10d in the middle, and fifth vehicle 10e at the outby end. Generally, signals received from the distance sensor 306, 308 may be used to control a speed of the vehicles based on the detected variable inter-vehicle distance, for example, to maintain a specified inter-vehicle distance. In some example embodiments, each vehicle 10 may be configured to maintain the specified inter-vehicle distance with the adjacent vehicle leading that respective vehicle 10. For example, when travelling in the inby direction, the third car 10c would follow to maintain the intercar distance with the second car 10b.

Although some described embodiments include the speed and angle of the leading car being controlled by a radio joystick, it would be appreciated that some example embodiments may include pre-programmed or automated steering of the lead car.

Figure 30:
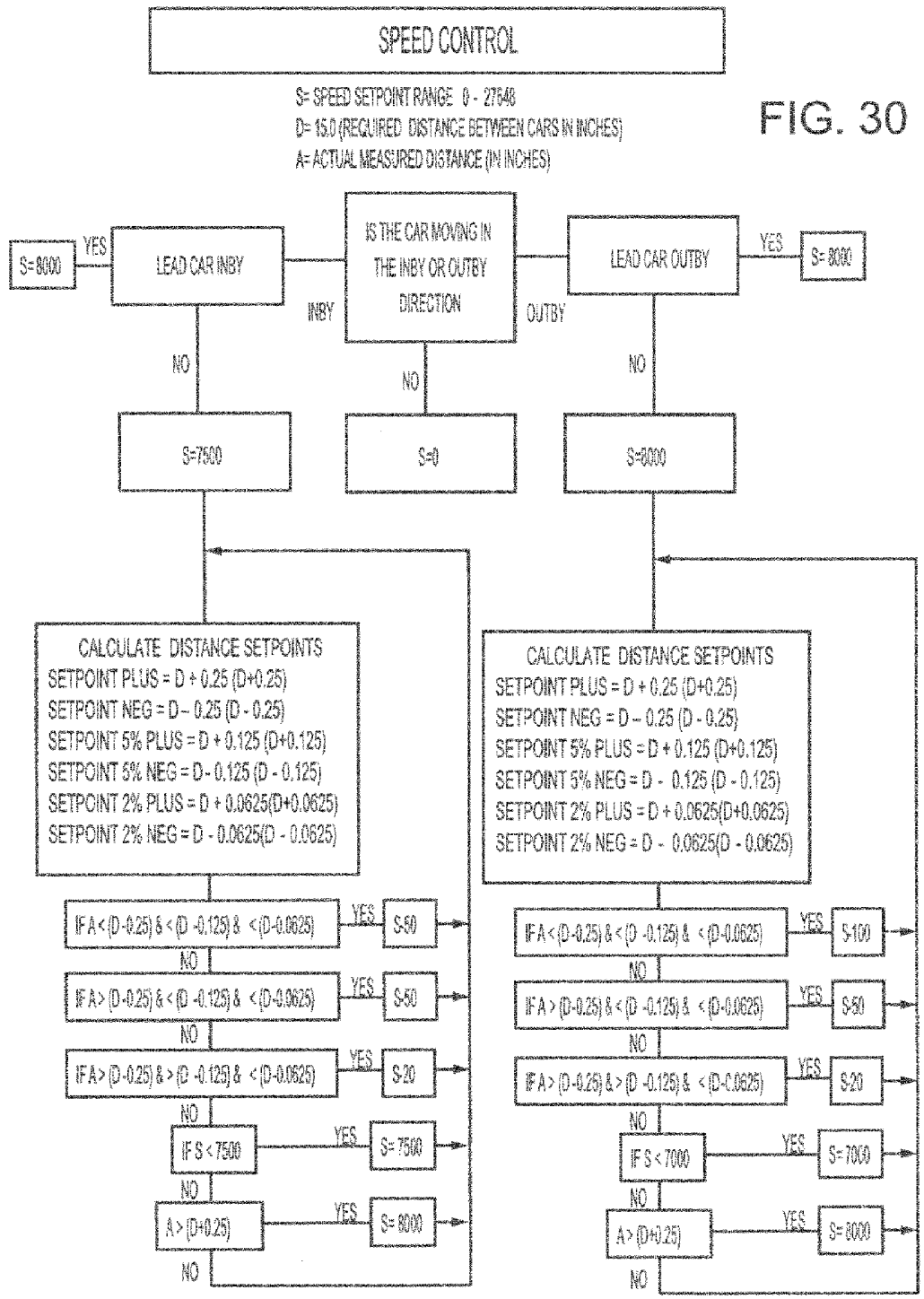
FIG. 30 is an example flow diagram for speed control of the conveyor vehicle.

Reference is now made to FIG. 30, which shows an example flow diagram for speed control of a conveyor vehicle 10. Generally, the PLC 36 of the vehicle 10 may be used to control the speed of the wheels 17 to 20 to maintain a specified inter-vehicle distance with the adjacent leading vehicle.

Figure 31:
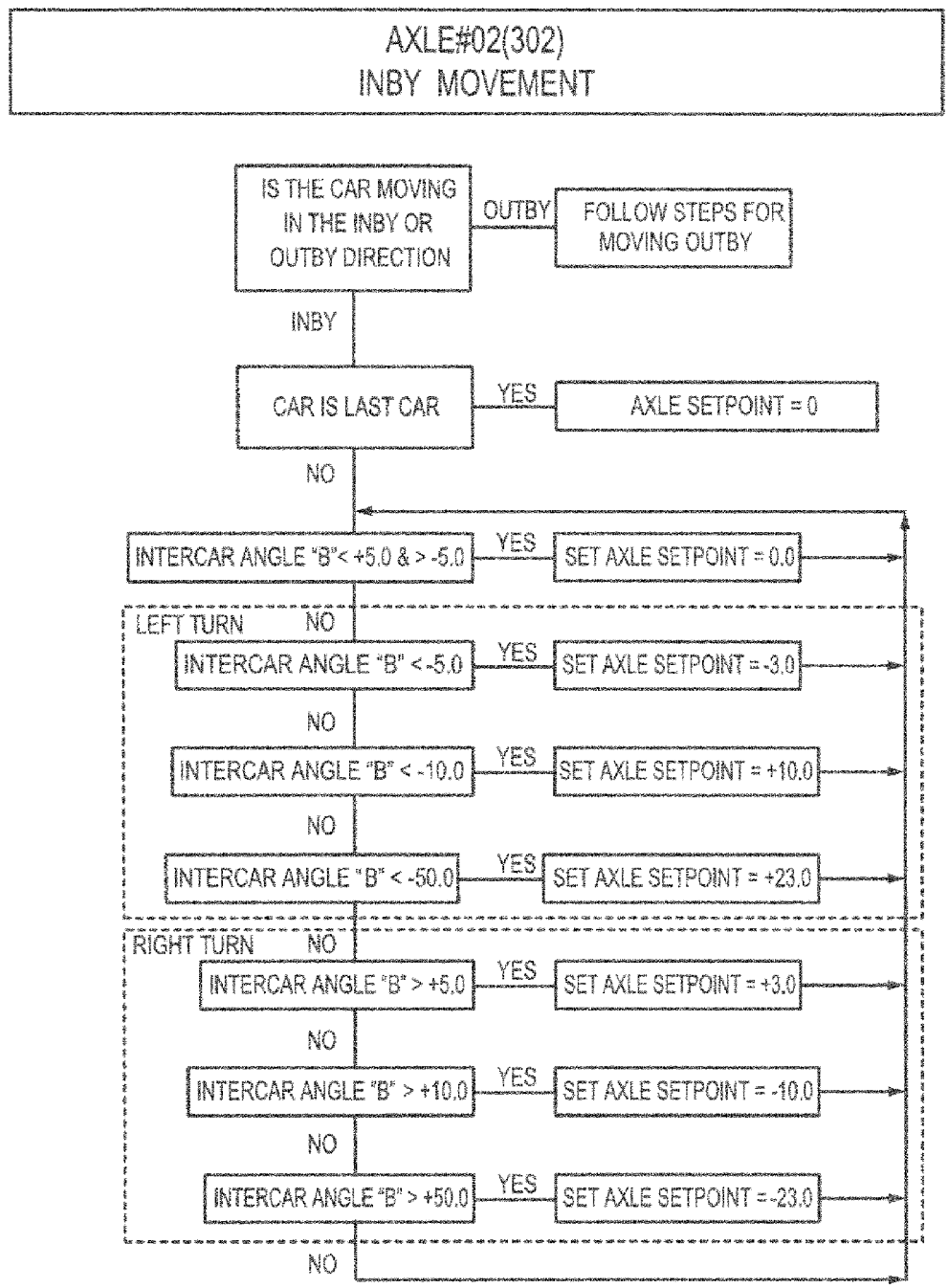
FIG. 31 is an example flow diagram for outby (rear) angle axle control for inby movement of the conveyor vehicle.
Figure 32:
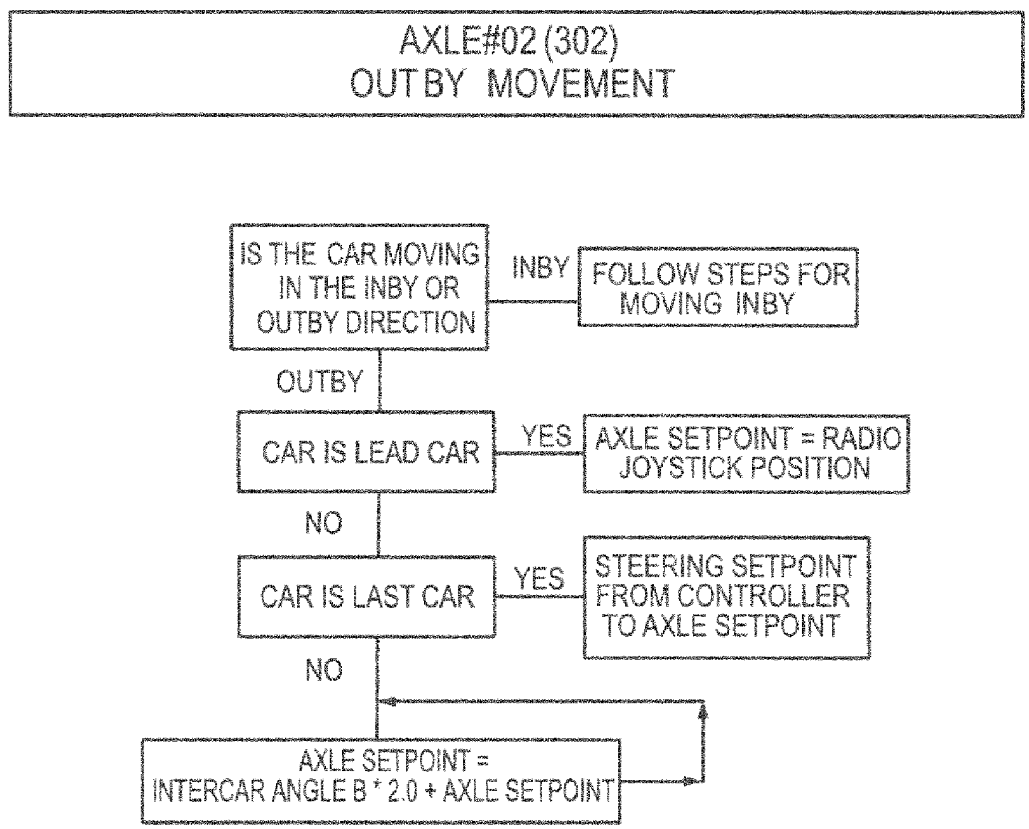
FIG. 32 is an example flow diagram for outby (rear) angle axle control for outby movement of the conveyor vehicle.
Figure 33:
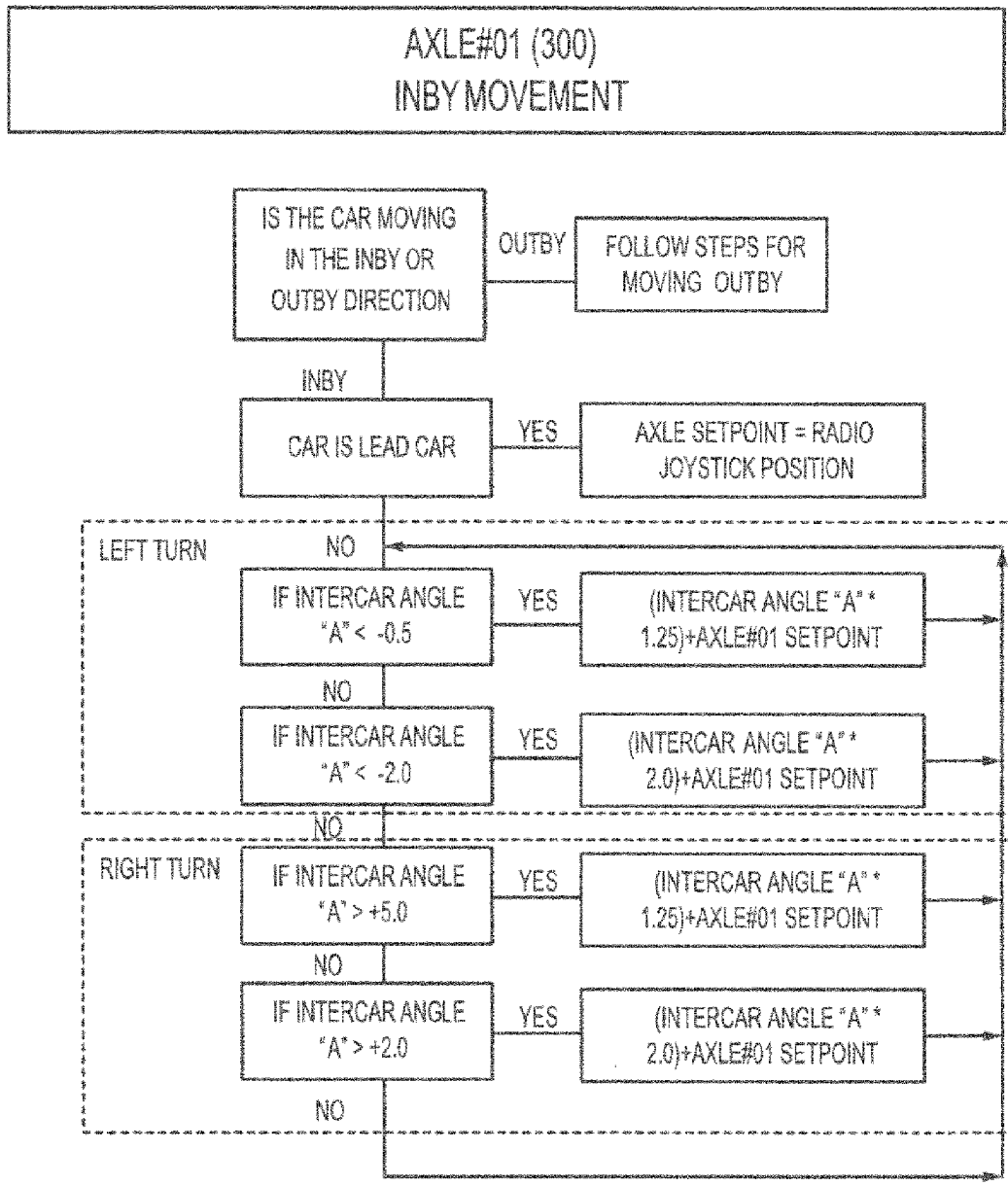
FIG. 33 is an example flow diagram for inby (front) angle axle control for inby movement of the conveyor vehicle.
Figure 34:
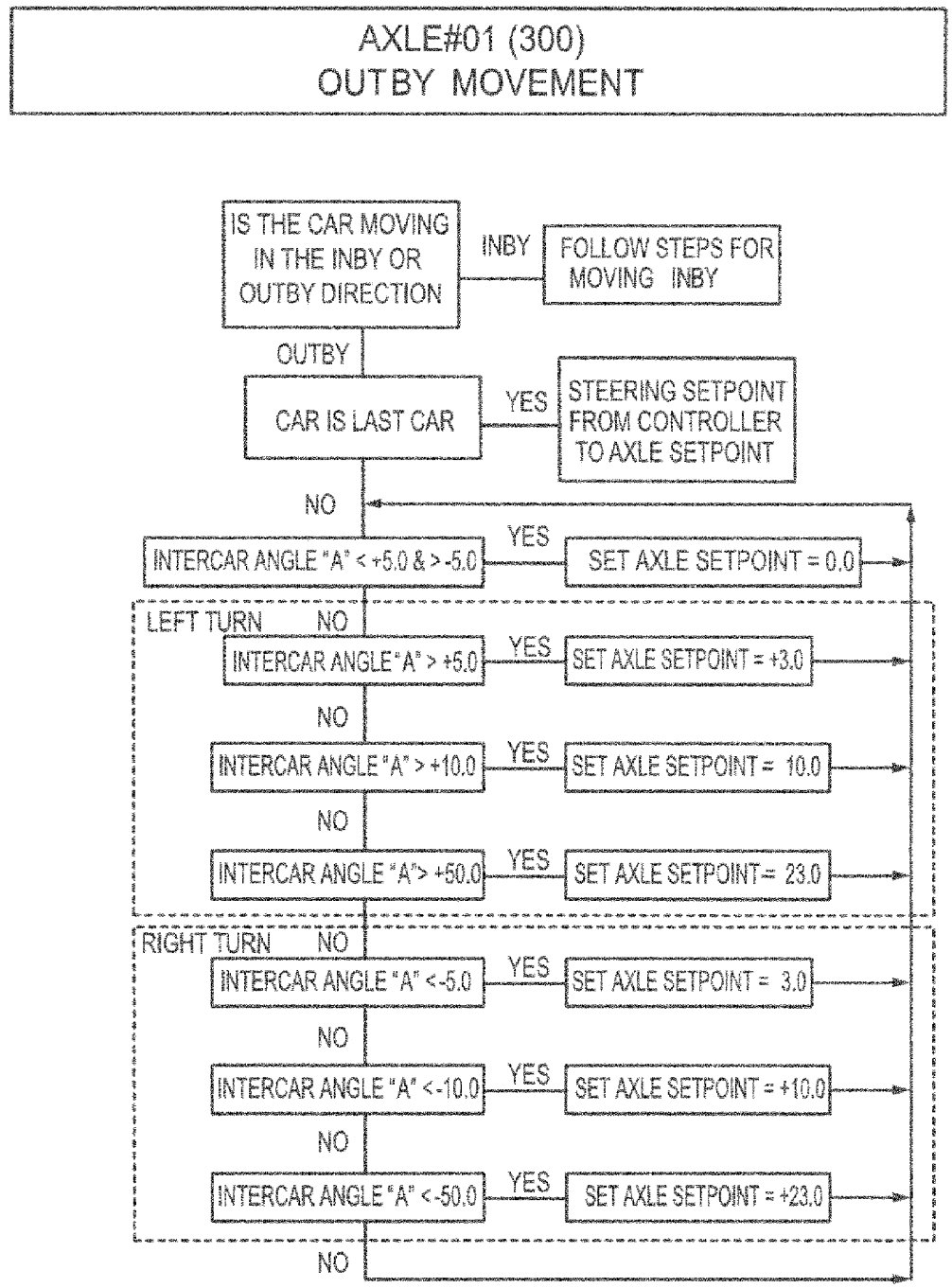
FIG. 34 is an example flow diagram for inby (front) angle axle control for outby movement of the conveyor vehicle.

FIGS. 31 to 34 illustration example flow diagrams for controlling the axle setpoints 300, 302. FIG. 31 shows example control of the outby angle axle setpoint 302 for inby movement of the conveyor vehicle 10, FIG. 32 shows example control of the outby angle axle setpoint 302 for outby movement of the conveyor vehicle 10, FIG. 33 shows example control for the inby angle axle setpoint 300 for inby movement of the conveyor vehicle 10, and FIG. 34 shows example control for the inby angle axle setpoint 300 for outby movement of the conveyor vehicle 10.

As can be appreciated, in some example embodiments, only the detected inter-vehicle angle is required to adjust the axle setpoints 300, 302, as the inter-vehicle distance is maintained by the process described with respect to FIG. 30. Thus, additional information such as distance traveled, inter-vehicle distance, etc., may not be required at this stage in some example embodiments.

Referring to FIG. 28, in some example embodiments, control of the rear setpoint axle may "look backwards" and depend on the rear inter-vehicle angle. For example, when the first vehicle 10a is travelling in the inby direction, note that the second setpoint axle 302 (rear axle) may be based on the outby angle sensor 82, which is the inter-vehicle angle of the trailing vehicle 10b. When the second vehicle 10b is travelling in the outby direction, note that the first setpoint axle 300 (rear axle) may be based on the inby angle sensor 170, which represents the inter-vehicle angle of the trailing vehicle 10a. The process for such rear setpoint axle control is illustrated in FIGS. 31 and 34, which detect or sense rearwardly.

Referring again to FIGS. 31 and 34, in example embodiments, the rear angle axle setpoint may be controlled as follows. For example, referring to FIG. 31, when moving in the inby direction, and when detecting (looking rearwardly) a left inter-vehicle angle of five degrees or less, the second axle setpoint 302 may controlled to turn left for three degrees. For sharper left turns, for example ten degrees or larger, the second axle setpoint 302 in fact turns rightwardly, for example ten degrees rightwardly for inter-vehicle angles of five to ten degrees, or twenty three degrees rightwardly for inter-vehicle angles of ten degrees or more. Still referring to FIG. 31, a similar process is followed for right turns. A similar process is illustrated in FIG. 34 for movement in the outby direction.

Referring again to FIGS. 31 and 34, in some example embodiments, if the vehicle is the last car, then there is no opportunity to "look backwards" to control the rear angle axle setpoint. In some example embodiments, the rear angle axle setpoint of the last car may follow the same steering as the last car's leading angle axle setpoint (adjusted to angle when at the same traveled position). In other example embodiments, not shown, the rear angle axle setpoint may be set at zero degrees (e.g. straight forward) for simplicity.

In some example embodiments, additional sensor information may be received and used, such as from the vertical angle sensor at 138. For example, if it is detected that a leading vehicle has a positive vertical angle, the controlled speed of the wheels may be controlled to be relatively faster to account for an uphill climb. For example, if it is detected that a leading vehicle has a negative vertical angle, the speed of the wheels may be controlled to be relatively slower to account for the downhill movement. Such control may be readily configured using known trigonometric principals. Referring to FIG. 30, for example, the calculated speed setpoints may be adjusted (e.g. factoring the cosine of the angle) to take into account the detected incline or decline angle. In other example embodiments, a sensor may be used to detect the vertical angle of the vehicle with respect to ground.

It would be appreciated that the example speed and angle control illustrated in FIGS. 30 to 34 may be considered a modular system. For example, each vehicle 10 may be independently controlled by their respective PLC 36, with vehicles 10 being readily added or taken away as necessary with little or no additional configuration required. Each vehicle 10 may use information that is received from their resident sensors. Thus, in such example embodiments, intercommunication between vehicles 10 may not be required or necessary. Further, it may be appreciated that each of the vehicles 10 may be configured to move in the inby or outby direction, with independent wheel axle control and speed propulsion, as required.

Although some of the described example embodiments have been described as the vehicles 10 being independent and modular, in some other example embodiments the PLCs 36 of the vehicles 10 may communicate with each other in a control system. For example, each of the PLCs 36 may each be associated with a communications subsystem for communication there between. The communications may be performed via, for example, a bus, a wireless bus, through serial communications, etc. In some example embodiments, the PLCs 36 may operate in a master-slave relationship. For example, referring to FIG. 29, the lead vehicle (inby first vehicle 10a) may include the master PLC 36 while the remaining vehicles 10b to 10e may be configured as the slave PLC 36. Similarly, if moving in the outby direction, the fifth vehicle 10e may include the master PLC 36, with the remaining vehicles 10a to 10d configured as the slave PLC 36. In other example embodiments, a separate master PLC may be used, for example, located at an operations headquarters.

In such example embodiments with inter-vehicle communication, for example, only one set of angle sensor and one distance sensor may be required at one end (e.g. at the inby end or outby end), as the angle and distance information for the other end would be communicated from an adjacent vehicle.

Figure 35:
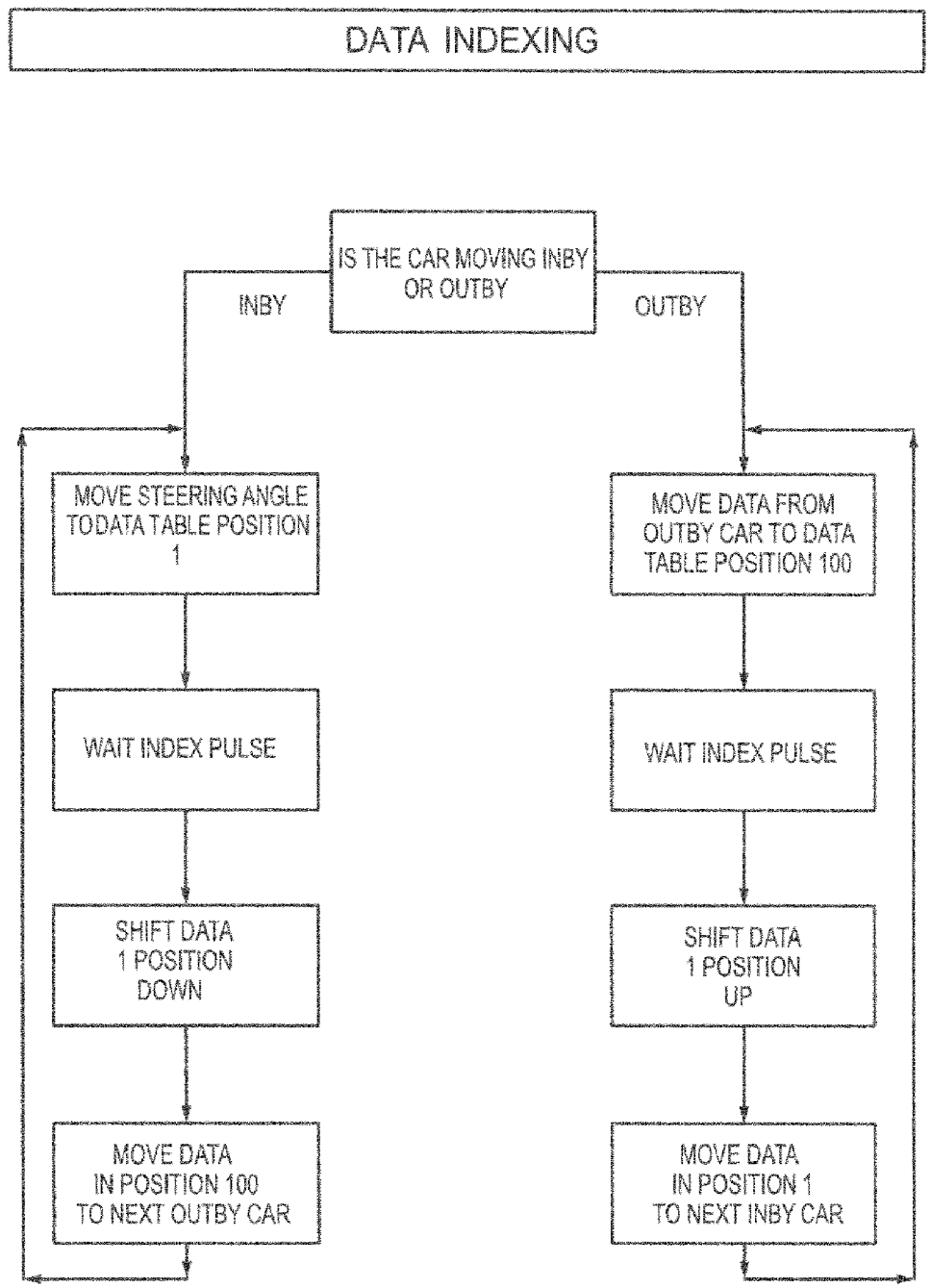
FIG. 35 is an example flow diagram for angle axle control of the conveyor vehicle, in accordance with another example embodiment.

Referring again to FIG. 27, with inter-vehicle communication, the pulses from the proximity switches 48 of the leading axle may be used to provide and index steering data for the trailing vehicles. The proximity switches 48 may be used as a position sensor for detecting an amount of distance traveled by the vehicle. The pulses from the proximity switch 48 on each car are averaged to give a pulse e.g. every 2 inches of travel. This pulse is used to index steering data through the length of the car and subsequent cars. For example, FIG. 35 is an example flow diagram for angle axle control of the conveyor vehicle, in accordance with another example embodiment. The angle axle control is based on the axle setpoint 300, 302, the inter-vehicle distance, and the amount of distance traveled by the wheels 17 to 20. This type of system allows angle of the angle axle setpoints 300, 302 and distance traveled information to be sent to each trailing vehicle, so that those trailing vehicles will follow the leading vehicle, to tram to the same traveled position and angle as the leading vehicle. The next trailing vehicle would perform a similar control as shown in FIG. 35, based on the received angle information and required distance traveled information.

In some example embodiments, a vehicle 10 may have speed control in dependence of an inter-vehicle of other vehicles. For example, referring to FIG. 29, the third vehicle 10c may speed up in dependence of the detected inter-vehicle distance between the first vehicle 10a and the second vehicle 10b. This decision may be made based on communications received from, for example, the first vehicle 10a, the second vehicle 10b, or a master PLC.

In some example embodiments, it may be appreciated that at least one or all of the sensors may be independent of the described hitch assembly. For example, an infrared, radiofrequency (RF) or optical sensor may be used to determine an inter-vehicle distance using time of flight. In some examples, a signal burst may be sent and bounced off of an adjacent vehicle, with the received signal being used to calculate the inter-vehicle distance. In another example, for example referring to FIG. 28, one of a wireless transmitter or receiver may be positioned at the outby end of the first vehicle 10a, while the other transmitter or receiver may be positioned at the inby end of the second vehicle 10b, to determine the inter-vehicle distance and/or angle. Such wireless sensors can be used to more accurately detect the angle or distance between a longitudinal center-line of adjacent vehicles.

While the present invention has been illustrated and described as embodied in the illustrated exemplary embodiments, it is to be understood that the present invention is not limited to the details shown herein, since it will be understood that various omissions, modifications, substitutions and changes in the forms and details of the disclosed hitch apparatus and its operation may be made by those skilled in the art without departing in any way from the scope of the present invention. Those of ordinary skill in the art will readily adapt the present disclosure for various other applications without departing from the scope of the present invention.

Having thus described our invention, we claim:

1. A steering system for controlling a steerable, self-propelled vehicle for travelling in an end-to-end series of steerable, self-propelled vehicles, the system comprising:
the vehicle including a plurality of individually controllable propelling devices connected at a generally vertical pivot to an axle of the vehicle;
an angle sensor for detecting an inter-vehicle angular position between two of the vehicles and providing a corresponding signal indicative thereof;
a distance sensor for detecting an inter-vehicle distance between two of the vehicles and providing a corresponding signal indicative thereof; and
a controller system configured to:
receive the signals from the angle sensor and the distance sensor,
control a speed of each propelling device based on the inter-vehicle distance, and
control an angle of each propelling device based on the inter-vehicle angular position.

2. The steering system of claim 1, wherein the angle sensor and the distance sensor detect in relation to at least one of a leading vehicle and a trailing vehicle.

3. The steering system of claim 2, wherein the controlled speed and angle of one or more front propelling devices are dependent on the signals in relation to the leading vehicle.

4. The steering system of claim 2, wherein the controlled angle of one or more rear propelling devices are dependent on the signals in relation to the trailing vehicle.

5. The steering system of claim 1, wherein the controlled angle of one or more rear propelling devices are controlled to angle opposite of the detected inter-vehicle angle.

6. The steering system of claim 1, wherein the angle is controlled independent of the detected inter-vehicle distance.

7. The steering system of claim 1, wherein the controller system is further configured to send information corresponding to the received signals to another controller system for control of another vehicle.

8. The steering system of claim 1, wherein the distance sensor includes at least one of a wireless transmitter and a wireless receiver.

9. The steering system of claim 1, wherein the angle sensor includes at least one of a wireless transmitter and a wireless receiver.

10. The steering system of claim 1, wherein the angle sensor detects at least one of a horizontal inter-vehicle angle and a vertical inter-vehicle angle.

11. The steering system of claim 2, further comprising a hitch assembly pivotally connecting the vehicle to the leading or trailing vehicle.

12. A method for controlling a steerable, self-propelled vehicle for travelling in an end-to-end series of steerable, self-propelled vehicles, the vehicle including a plurality of individually controllable propelling devices connected at a generally vertical pivot to an axle of the vehicle, the method comprising:
detecting an inter-vehicle angular position between two of the vehicles;
detecting an inter-vehicle distance between two of the vehicles; and
with a processor
controlling a speed of each propelling device based on the inter-vehicle distance; and
controlling an angle of each propelling device based on the inter-vehicle angular position.

13. The method of claim 12, wherein detecting the inter-vehicle angular position and the inter-vehicle distance are detected relative to at least one of a leading vehicle and a trailing vehicle.

14. The method of claim 13, wherein controlling the speed and controlling the angle of one or more propelling devices are based on the inter-vehicle angular position and distance relative to the leading vehicle.

15. The method of claim 13, wherein controlling the speed and controlling the angle of one or more propelling devices are based on the inter-vehicle angular position and distance relative to the trailing vehicle.

16. The method of claim 12, wherein the controlling the angle of each propelling device comprises controlling an angle of one or more rear propelling devices to an angle opposite of the detected inter-vehicle angle.

17. The method of claim 12, wherein the angle is controlled independent of the detected inter-vehicle distance.

18. The method of claim 12, further comprising sending information detected at a first vehicle to a second vehicle for controlling the second vehicle.

19. The method of claim 18, wherein the information is sent wirelessly.

20. The method of claim 12, wherein detecting the inter-vehicle angular position includes detecting at least one of a horizontal inter-vehicle angle and a vertical inter-vehicle angle.

21. A non-transitory computer-readable medium containing instructions stored thereon executable by a processor for controlling a steerable, self-propelled vehicle for travelling in an end-to-end series of steerable, self-propelled vehicles, the vehicle including a plurality of individually controllable propelling devices connected at a generally vertical pivot to an axle of the vehicle, the instructions comprising:

instructions for receiving a signal indicative of an inter-vehicle angular position between two of the vehicles;

instructions for receiving a signal indicative of an inter-vehicle distance between two of the vehicles;

instructions for controlling a speed of each propelling device based on the inter-vehicle distance; and instructions for controlling an angle of each propelling device based on the inter-vehicle angular position.

* * * * *